United States Patent
Ando et al.

(10) Patent No.: US 6,878,294 B2
(45) Date of Patent: Apr. 12, 2005

(54) RUNNING METHOD AND TREATMENT SYSTEM FOR SPIRAL WOUND MEMBRANE ELEMENT AND SPIRAL WOUND MEMBRANE MODULE

(75) Inventors: Masaaki Ando, Ibaraki (JP); Katsumi Ishii, Ibaraki (JP); Satoru Ishihara, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 191 days.

(21) Appl. No.: 09/899,649

(22) Filed: Jul. 5, 2001

(65) Prior Publication Data

US 2002/0060193 A1 May 23, 2002

(30) Foreign Application Priority Data

Jul. 6, 2000 (JP) ........................... 2000-204946
Jul. 19, 2000 (JP) ........................... 2000-219451
Mar. 14, 2001 (JP) ........................... 2001-072695

(51) Int. Cl.[7] ........................... B01D 65/02; B01D 63/10
(52) U.S. Cl. ................... 210/798; 210/106; 210/108; 210/194; 210/252; 210/258; 210/321.69; 210/321.74; 210/321.83; 210/411; 210/636; 210/650; 210/791; 210/797; 210/805
(58) Field of Search ................... 210/106, 108, 210/194, 252, 258, 411, 321.69, 321.74, 321.83, 636, 650, 791, 797, 798

(56) References Cited

U.S. PATENT DOCUMENTS

| | | | | |
|---|---|---|---|---|
| 3,966,616 A | * | 6/1976 | Bray | 210/450 |
| 4,906,372 A | * | 3/1990 | Hopkins | 210/321.74 |
| 5,128,037 A | * | 7/1992 | Pearl et al. | 210/321.74 |
| 5,376,278 A | * | 12/1994 | Salem | 210/679 |
| 6,190,557 B1 | * | 2/2001 | Hisada et al. | 210/650 |
| 6,402,956 B1 | * | 6/2002 | Andou et al. | 210/650 |
| 6,432,310 B1 | * | 8/2002 | Andou et al. | 210/636 |
| 6,565,747 B1 | * | 5/2003 | Shintani et al. | 210/321.74 |
| 2002/0027103 A1 | * | 3/2002 | Ando et al. | 210/650 |
| 2002/0027111 A1 | * | 3/2002 | Ando et al. | 210/791 |

FOREIGN PATENT DOCUMENTS

| | | |
|---|---|---|
| EP | 0 920 905 A1 | 6/1999 |
| EP | 1 022 050 A2 | 7/2000 |
| GB | 1 535 832 A | 12/1978 |
| JP | 02265628 A | 10/1990 |
| JP | 03 008419 A | 1/1991 |
| JP | 10-225626 A | 8/1998 |
| JP | 11 169684 A | 6/1999 |
| JP | 11 207335 A | 8/1999 |
| JP | 2000-271457 A | 10/2000 |
| JP | 2001 157825 A | 6/2001 |
| WO | WO 85/01449 A1 | 4/1985 |
| WO | WO 88/00494 A1 | 1/1988 |
| WO | 2001-113140 A | 4/2001 |

* cited by examiner

Primary Examiner—John Kim
(74) Attorney, Agent, or Firm—Akin Gump Strauss Hauer & Feld, LLP

(57) ABSTRACT

A spiral wound membrane element allowing back wash reverse filtration at 0.05 MPa to 0.3 MPa is employed for a spiral wound membrane module. Air injection of injecting air of not more than 0.3 MPa into a permeate outlet of the spiral wound membrane module from a pressurized air feeder through a pipe, back wash reverse filtration with permeate and flushing with raw water are performed as recovery of a filtration velocity. Another spiral wound membrane module comprises a spiral wound membrane element including a separation membrane having high back pressure strength. Raw water into which bubbles are diffused by an air diffuser is fed to the spiral wound membrane element stored in a pressure vessel. Part of the raw water is axially fed through the spiral wound membrane element, discharged from a raw water outlet of the pressure vessel and thereafter returned to a raw water tank through a pipe.

13 Claims, 18 Drawing Sheets

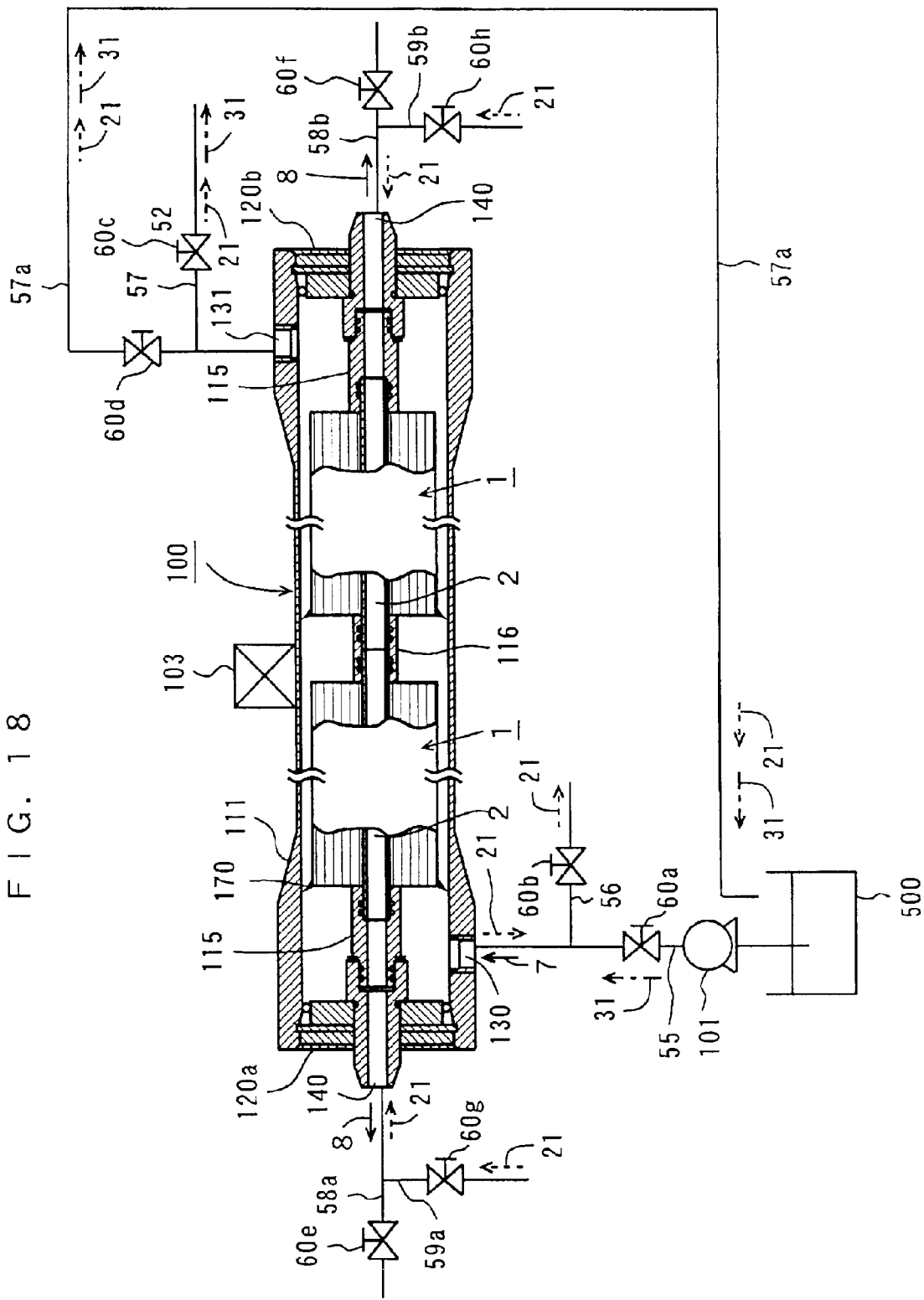

RUNNING METHOD AND TREATMENT SYSTEM FOR SPIRAL WOUND MEMBRANE ELEMENT AND SPIRAL WOUND MEMBRANE MODULE

BACKGROUND OF THE INVENTION

1. Field of the Invention

The present invention relates to a running method and a treatment system for a spiral wound membrane element and a spiral wound membrane module employed for a membrane separator such as a reverse osmosis membrane separator, an ultrafiltration membrane separator, a microfiltration membrane separator or the like.

2. Description of the Prior Art

Application of membrane separation is recently spread to water purification and waste water treatment, so that membrane separation is applied to hardly treatable liquid quality. In particular, recovery and recycling of industrial waste water through membrane separation is strongly demanded.

A hollow fiber membrane element is generally employed for such membrane separation in consideration of the membrane area (volumetric efficiency) per unit volume. However, the membrane of the hollow fiber membrane element is readily broken, and raw water is disadvantageously mixed into permeate to reduce separation performance when the membrane is broken.

Therefore, application of a spiral wound membrane element in place of the hollow fiber membrane element is proposed. The spiral wound membrane element can advantageously provide a large membrane area per unit volume similarly to the hollow fiber membrane element and maintain separation performance, and has high reliability.

When waste water containing a large amount of suspended, colloidal or dissolved matter is subjected to membrane separation, the suspended, colloidal or dissolved matter is deposited on a membrane surface as contaminants to reduce the water permeation velocity. Particularly in dead end filtration, contaminants are so readily deposited on the membrane surface that the water permeation velocity is remarkably reduced and it is difficult to continue stable filtration running.

In order to prevent the membrane surface from deposition of contaminants, cross flow filtration is performed. In this cross flow filtration, raw water is fed in parallel with the membrane surface for preventing the membrane surface from deposition of contaminants through shearing force caused on the interface between the membrane surface and fluid. In such cross flow filtration, a sufficient membrane surface linear velocity must be obtained for preventing the membrane surface from deposition of contaminants, and hence a sufficient flow rate of raw water must be fed in parallel with the membrane surface. When the flow rate of the raw water fed in parallel with the membrane surface is increased, however, the recovery per spiral wound membrane element is reduced and a large pump is required for feeding the raw water, while the system cost is remarkably increased.

On the other hand, contaminants deposited on the membrane surface may be removed by back wash reverse filtration. This back wash reverse filtration is generally performed in a hollow fiber membrane element.

For example, Japanese Patent Publication No. 6-98276 (1994) proposes application of back wash reverse filtration to a spiral wound membrane element. However, back pressure strength of a separation membrane of a conventional spiral wound membrane element is so low that the separation membrane may be broken when subjected to a back pressure in back wash reverse filtration. Therefore, the aforementioned gazette states that the spiral wound membrane element is preferably subjected to back wash reverse filtration with a low back pressure of 0.1 to 0.5 $kg/cm^2$ (0.01 to 0.05 MPa).

According to an experiment made by the inventor, however, it was difficult to sufficiently remove contaminants when a spiral wound membrane element was subjected to back wash reverse filtration with such a back pressure, and it was impossible to maintain a high permeate flux over a long period.

The inventor has proposed a structure of and a method of preparing a separation membrane having back pressure strength of at least 2 $kgf/cm^2$ in Japanese Patent Laying-Open No. 10-225626 (1998). However, it has not yet been sufficiently verified in relation to a spiral wound membrane element prepared with the separation membrane having such back pressure strength as to the level of a back pressure enabling back wash reverse filtration in practice and the range of the back pressure for back wash reverse filtration enabling the spiral wound membrane element to maintain a high permeate flux over a long period. Further, no verification has been made on a method of running a spiral wound membrane element including the aforementioned separation membrane having high back pressure strength and a method of running a spiral wound membrane module comprising such a spiral wound membrane element.

Also when the separation membrane having high back pressure strength is employed, stable filtration running cannot be continuously performed in a spiral wound membrane element and a spiral wound membrane module without reducing the permeate flux over a long period unless optimum washing conditions and an optimum washing method are applied and the filtration running is performed by an optimum method.

SUMMARY OF THE INVENTION

An object of the present invention is to provide a running method and a treatment system for a spiral wound membrane element and a spiral wound membrane module capable of performing stable filtration running at a low cost while maintaining a high permeate flux over a long period.

Another object of the present invention is to provide a highly reliable spiral wound membrane module which can be reduced in cost and readily washed.

According to an aspect of the present invention, a method of running a spiral wound membrane element, comprising an envelope separation membrane wound on the outer peripheral surface of a perforated hollow pipe and allowing back wash reverse filtration with a back pressure higher than 0.05 MPa and not more than 0.3 MPa, comprises a step of performing an operation of injecting gas of not more than 0.3 MPa from at least one opening end of the perforated hollow pipe as recovery of a filtration velocity.

In this method of running a spiral wound membrane element, the gas of not more than 0.3 MPa is injected from at least one opening end of the perforated hollow pipe as recovery of the filtration velocity. The gas is guided into the envelope separation membrane from the outer peripheral surface of the perforated hollow pipe for applying an effective back pressure to the overall separation membrane. Thus, contaminants deposited on the membrane surface of the separation membrane can be floated. Therefore, the contaminants deposited on the membrane surface of the separation membrane can be effectively discharged from the system. Consequently, stable filtration running can be performed while maintaining a high permeate flux over a long period.

In this case, the spiral wound membrane element can be subjected to back wash reverse filtration with the back pressure higher than 0.05 MPa and not more than 0.3 MPa, whereby the injected gas of not more than 0.3 MPa does not damage the separation membrane by separating the same from a separation membrane support. Further, the bubble point of the separation membrane having the aforementioned back pressure strength is at least 0.3 MPa, and hence pores of the separation membrane are not replaced with the injected gas of not more than 0.3 MPa to reduce the permeate flow rate.

The step of performing the operation may include a step of performing an operation of introducing a washing liquid from at least one opening end of the perforated hollow pipe and discharging the washing liquid from at least one end of the spiral wound membrane element thereby performing back wash reverse filtration of the separation membrane with a back pressure higher than 0.05 MPa and not more than 0.3 MPa in combination with the operation of injecting the gas as recovery of the filtration velocity.

The washing liquid introduced from at least one opening end of the perforated hollow pipe is guided into the envelope separation membrane from the outer peripheral surface of the perforated hollow pipe and permeated through the separation membrane in a direction opposite to that in filtration. Thus, the separation membrane is subjected to back wash reverse filtration, and contaminants deposited on the membrane surface of the separation membrane are separated from the separation membrane.

Even if a back pressure of 0.3 MPa is applied to the opening end of the perforated hollow pipe, for example, it is difficult to homogeneously apply the back pressure to the envelope separation membrane due to passage resistance of the members forming the spiral wound membrane element, and the back pressure on the separation membrane causes pressure distribution along the longitudinal direction of the separation membrane. Thus, the flow rate of the washing liquid permeated per unit area may be so distributed along the longitudinal direction of the separation membrane that the separation membrane cannot be homogeneously subjected to back wash reverse filtration but contaminants are deposited on the membrane to reduce the permeate flux.

In this case, the time interval for the back wash reverse filtration is generally reduced for frequently performing back wash reverse filtration, or chemical washing is performed for maintaining the permeate flux if the permeate flux is remarkably reduced. If the back wash reverse filtration is frequently performed, however, the amount of the discharged washing liquid is increased and the recovery is reduced. When chemical washing is performed, on the other hand, waste chemical wash water must be treated and a high chemical cost is required.

When the operation of injecting the gas and the back wash reverse filtration are combined with each other as recovery of the filtration velocity as described above, an effective back pressure can be applied to the overall envelope separation membrane due to the operation of injecting the gas for floating the contaminants deposited on the membrane surface, and the contaminants deposited on the membrane surface can be more effectively discharged from the system due to the back wash reverse filtration. Consequently, more stable filtration running can be performed while maintaining a high permeate flux over a longer period.

In this case, the separation membrane is subjected to back wash reverse filtration with the back pressure higher than 0.05 MPa and not more than 0.3 MPa, whereby a necessary amount of the washing liquid can be fed in a short time. Thus, the contaminants deposited on the membrane surface of the separation membrane can be effectively removed.

The back wash reverse filtration may be performed before, simultaneously with or after the operation of injecting the gas.

The step of performing the operation may include a step of performing an operation of axially feeding a raw liquid through the spiral wound membrane element in combination with the operation of injecting the gas as recovery of the filtration velocity.

Also in this case, an effective back pressure can be applied to the overall envelope separation membrane due to the operation of injecting the gas for floating the contaminants deposited on the membrane surface, and the contaminants deposited on the membrane surface can be more effectively discharged from the system due to the operation of axially feeding the raw liquid through the spiral wound membrane element. Consequently, more stable filtration running can be performed while maintaining a high permeate flux over a longer period.

The operation of injecting the gas, the back wash reverse filtration and the operation of axially feeding the raw liquid through the spiral wound membrane element are preferably combined with each other as recovery of the filtration velocity. In this case, the contaminants deposited on the membrane surface can be more effectively discharged from the system, and more stable filtration can be performed while maintaining a high permeate flux over a longer period.

According to the aforementioned method of running a spiral wound membrane element, as hereinabove described, filtration can be so stably performed that a permeated liquid can be efficiently obtained. Further, no large pump is required for feeding the raw liquid but the scale of the system can be reduced. Thus, the system cost is reduced.

The step of performing the operation may further include a step of returning at least part of the raw liquid axially fed through the spiral wound membrane element to a feeding side of the spiral wound membrane element again.

The permeated liquid can be obtained with high recovery by circulating the raw liquid in the aforementioned manner.

The separation membrane may be formed by bonding a permeable membrane body to a surface of a porous sheet material, and the permeable membrane body may be bonded to the surface of the porous sheet material in an anchored state.

In such a separation membrane, bonding between the porous sheet material and the permeable membrane body is reinforced to improve the back pressure strength of the separation membrane. Thus, the spiral wound membrane element can be sufficiently subjected to back wash reverse filtration with the back pressure higher than 0.05 MPa and not more than 0.3 MPa without breaking the separation membrane of the spiral wound membrane element.

In particular, the back pressure strength of the separation membrane is preferably at least 0.2 MPa. Thus, back wash reverse filtration with a high back pressure is so enabled that stable membrane separation can be performed over a long period by sufficiently washing the separation membrane.

In particular, the porous sheet material is preferably made of woven fabric, nonwoven fabric, a mesh net or a foaming sintered sheet of synthetic resin.

Further, the porous sheet material is preferably made of nonwoven fabric having a thickness of at least 0.08 mm and not more than 0.15 mm and density of at least 0.5 g/cm$^3$ and not more than 0.8 g/cm$^3$.

Thus, back pressure strength of at least 0.2 MPa can be obtained and increase of permeation resistance as well as separation of the permeable membrane body can be prevented while ensuring strength for serving as a reinforcing sheet.

According to another aspect of the present invention, a method of running a spiral wound membrane module, comprising a pressure vessel having a raw liquid inlet and one or a plurality of spiral wound membrane elements stored in the pressure vessel with the spiral wound membrane element including a perforated hollow pipe and an envelope separation membrane wound on the outer peripheral surface of the perforated hollow pipe and allowing back wash reverse filtration with a back pressure higher than 0.05 MPa and not more than 0.3 MPa, comprises a step of performing an operation of injecting gas of not more than 0.3 MPa from at least one opening end of the perforated hollow pipe as recovery of a filtration velocity.

In the method of running a spiral wound membrane module, the gas of not more than 0.3 MPa is injected from at least one opening end of the perforated hollow pipe as recovery of the filtration velocity. The gas is guided into the envelope separation membrane from the outer peripheral surface of the perforated hollow pipe for applying an effective back pressure to the overall separation membrane. Thus, contaminants deposited on the membrane surface of the separation membrane can be floated. Therefore, the contaminants deposited on the membrane surface of the separation membrane can be effectively discharged from the system. Consequently, stable filtration running can be performed while maintaining a high permeate flux over a long period.

In this case, the spiral wound membrane element can be subjected to back wash reverse filtration with the back pressure higher than 0.05 MPa and not more than 0.3 MPa, and hence the injected gas of not more than 0.3 MPa does not damage the separation membrane by separating the same from a separation membrane support. Further, the bubble point of the separation membrane having the aforementioned back pressure strength is at least 0.3 MPa, and hence pores of the separation membrane are not replaced with the injected gas of not more than 0.3 MPa to reduce the permeate flow rate.

The step of performing the operation may include a step of performing an operation of introducing a washing liquid from at least one opening end of the perforated hollow pipe and discharging the washing liquid from at least one end of the spiral wound membrane element for taking out the washing liquid from the pressure vessel thereby performing back wash reverse filtration of the separation membrane with a back pressure higher than 0.05 MPa and not more than 0.3 MPa in combination with the operation of injecting the gas as recovery of the filtration velocity.

The washing liquid introduced from at least one opening end of the perforated hollow pipe is guided into the envelope separation membrane from the outer peripheral surface of the perforated hollow pipe and permeated through the separation membrane in a direction opposite to that in filtration. Thus, the separation membrane is subjected to back wash reverse filtration, and contaminants deposited on the membrane surface of the separation membrane are separated from the separation membrane.

When the operation of injecting the gas and the back wash reverse filtration are combined with each other as recovery of the filtration velocity as described above, an effective back pressure can be applied to the overall envelope separation membrane due to the operation of injecting the gas for floating the contaminants deposited on the membrane surface, and the contaminants deposited on the membrane surface can be more effectively discharged from the system due to the back wash reverse filtration. Consequently, more stable filtration running can be performed while maintaining a high permeate flux over a longer period.

In this case, the separation membrane is subjected to back wash reverse filtration with the back pressure higher than 0.05 MPa and not more than 0.3 MPa, whereby a necessary amount of the washing liquid can be fed in a short time. Thus, the contaminants deposited on the membrane surface of the separation membrane can be effectively removed.

The back wash reverse filtration may be performed before, simultaneously with or after the operation of injecting the gas.

The step of performing the operation may include a step of performing an operation of feeding a raw liquid into the spiral wound membrane element from the raw liquid inlet of the pressure vessel and axially feeding the raw liquid through the spiral wound membrane element while taking out the axially fed raw liquid from the pressure vessel in combination with the operation of injecting the gas as recovery of the filtration velocity.

Also in this case, an effective back pressure can be applied to the overall envelope separation membrane due to the operation of injecting the gas for floating the contaminants deposited on the membrane surface, and the contaminants deposited on the membrane surface can be more effectively discharged from the system due to the operation of axially feeding the raw liquid through the spiral wound membrane element. Consequently, more stable filtration running can be performed while maintaining a high permeate flux over a longer period.

The operation of injecting the gas, the back wash reverse filtration and the operation of axially feeding the raw liquid through the spiral wound membrane element are preferably combined with each other as recovery of the filtration velocity. In this case, the contaminants deposited on the membrane surface can be more effectively discharged from the system, and more stable filtration running can be performed while maintaining a high permeate flux over a longer period.

According to the aforementioned method of running a spiral wound membrane module, as hereinabove described, filtration can be so stably performed that a permeated liquid can be efficiently obtained. Further, no large pump is required for feeding the raw liquid but the scale of the system can be reduced. Thus, the system cost is reduced.

The step of performing the operation may include a step of re-feeding at least part of the raw liquid taken out from the pressure vessel to the raw liquid inlet.

A permeated liquid can be obtained with high recovery by circulating the raw liquid in the aforementioned manner.

The step of performing the operation may further include a step of re-feeding at least part of the washing liquid axially fed in washing.

The permeated liquid can be obtained with high recovery by circulating the raw liquid in the aforementioned manner.

According to still another aspect of the present invention, a treatment system comprises a spiral wound membrane module comprising a pressure vessel having a raw liquid inlet and one or a plurality of spiral wound membrane elements stored in the pressure vessel with each spiral wound membrane element including a perforated hollow pipe and an envelope separation membrane wound on the outer peripheral surface of the perforated hollow pipe and the separation membrane having back pressure strength allowing back wash reverse filtration with a back pressure higher than 0.05 MPa and not more than 0.3 MPa, a first raw liquid feeding system for feeding a raw liquid into the spiral wound membrane element through the raw liquid inlet of the pressure vessel, a permeated liquid takeout system for taking out a permeated liquid from at least one opening end of the perforated hollow pipe and a gas injection system for injecting gas of not more than 0.3 MPa into the spiral wound membrane element from at least one opening end of the perforated hollow pipe.

In this treatment system, the first raw liquid feeding system feeds the raw liquid into the spiral wound membrane element through the raw liquid inlet of the pressure vessel and the permeated liquid takeout system takes out the permeated liquid from at least one opening end of the perforated hollow pipe in filtration.

In recovery of a filtration velocity, the gas injection system injects the gas of not more than 0.3 MPa from at least one opening end of the perforated hollow pipe. The gas is guided into the envelope separation membrane from the outer peripheral surface of the perforated hollow pipe for applying an effective back pressure to the overall separation membrane. Thus, contaminants deposited on the membrane surface of the separation membrane can be floated. Therefore, the contaminants deposited on the membrane surface of the separation membrane can be effectively discharged from the system. Consequently, stable filtration running can be performed while maintaining a high permeate flux over a long period.

In this case, the spiral wound membrane element can be subjected to back wash reverse filtration with the back pressure higher than 0.05 MPa and not more than 0.3 MPa, and hence the injected gas of not more than 0.3 MPa does not damage the separation membrane by separating the same from a separation membrane support. Further, the bubble point of the separation membrane having the aforementioned back pressure strength is at least 0.3 MPa, and hence pores of the separation membrane are not replaced with the injected gas of not more than 0.3 MPa to reduce the permeate flow rate.

The treatment system may further comprise a washing liquid introduction system for introducing a washing liquid from at least one opening end of the perforated hollow pipe.

In this case, the washing liquid introduction system introduces the washing liquid from at least one opening end of the perforated hollow pipe in recovery of the filtration velocity. The washing liquid is guided into the envelope separation membrane from the outer peripheral surface of the perforated hollow pipe and permeated through the separation membrane in a direction opposite to that in filtration. Thus, the separation membrane is subjected to back wash reverse filtration, and contaminants deposited on the membrane surface of the separation membrane are separated from the separation membrane.

When the operation of injecting the gas and the back wash reverse filtration are combined with each other as recovery of the filtration velocity as described above, an effective back pressure can be applied to the overall envelope separation membrane due to the operation of injecting the gas for floating the contaminants deposited on the membrane surface, and the contaminants deposited on the membrane surface can be more effectively discharged from the system due to the back wash reverse filtration. Consequently, more stable filtration running can be performed while maintaining a high permeate flux over a longer period.

In this case, the separation membrane is subjected to back wash reverse filtration with the back pressure higher than 0.05 MPa and not more than 0.3 MPa, whereby a necessary amount of the washing liquid can be fed in a short time. Thus, the contaminants deposited on the membrane surface of the separation membrane can be effectively removed.

The treatment system may further comprise a second raw liquid feeding system for feeding a raw liquid into the spiral wound membrane element through the raw liquid inlet of the pressure vessel for axially feeding the raw liquid through the spiral wound membrane element and taking out the axially fed raw liquid from the pressure vessel.

In this case, the second raw liquid feeding system feeds the raw liquid into the spiral wound membrane element through the raw liquid inlet of the pressure vessel so that the raw liquid is axially fed through the spiral wound membrane element and the axially fed raw liquid is taken out from the pressure vessel in recovery of the filtration velocity.

Also in this case, an effective back pressure can be applied to the overall envelope separation membrane due to the operation of injecting the gas for floating the contaminants deposited on the membrane surface, and the contaminants deposited on the membrane surface can be more effectively discharged from the system due to the operation of axially feeding the raw liquid through the spiral wound membrane element. Consequently, more stable filtration running can be performed while maintaining a high permeate flux over a longer period.

According to the aforementioned treatment system, as hereinabove described, filtration can be so stably performed that the permeated liquid can be efficiently obtained. Further, no large pump is required for feeding the raw liquid but the scale of the system can be reduced. Thus, the system cost is reduced.

According to a further aspect of the present invention, a method of running a spiral wound membrane element, comprising an envelope separation membrane wound on the outer peripheral surface of a perforated hollow pipe and allowing back wash reverse filtration with a back pressure higher than 0.05 MPa and not more than 0.3 MPa, comprises a step of continuously or intermittently diffusing bubbles into a liquid coming into contact with the surface of the separation membrane.

According to this method of running a spiral wound membrane element, bubbles are diffused into the liquid coming into contact with the separation membrane surface of the spiral wound membrane element to form a flow of diffused air on the separation membrane surface of the spiral wound membrane element. Thus, contaminants contained in the liquid can be inhibited from adhering to the membrane surface of the spiral wound membrane element. Further, contaminants adhering to the membrane surface of the spiral wound membrane element can be separated.

Thus, the spiral wound membrane element can be stably run continuously over a long period.

In washing, a washing liquid is introduced from at least one opening end of the perforated hollow pipe. This washing liquid is derived into the envelope separation membrane from the outer peripheral surface of the perforated hollow pipe, and permeated through the separation membrane in a direction opposite to that in filtration. Thus, the separation membrane is subjected to back wash reverse filtration, so that contaminants deposited on the membrane surface of the separation membrane are separated from the separation membrane.

In this case, the separation membrane can be subjected to back wash reverse filtration with the back pressure higher than 0.05 MPa and not more than 0.3 MPa, whereby a necessary amount of the washing liquid can be fed in a short time. Thus, the contaminants deposited on the membrane surface of the separation membrane can be effectively removed. Consequently, stable filtration running can be performed while maintaining a high permeate flux over a long period also in dead end filtration readily causing deposition of contaminants on the membrane surface.

According to the aforementioned method of running a spiral wound membrane element, as hereinabove described, filtration can be so stably performed that a permeated liquid can be efficiently obtained. Further, no large pump may be employed for feeding the raw liquid but the scale of the system can be reduced. Thus, the system cost is reduced.

According to a further aspect of the present invention, a method of running a spiral wound membrane element, comprising an envelope separation membrane wound on the outer peripheral surface of a perforated hollow pipe and allowing back wash reverse filtration with a back pressure higher than 0.05 MPa and not more than 0.3 MPa, comprises a step of continuously or intermittently supplying ultrasonic vibration to a liquid being in contact with the surface of the separation membrane.

According to this method of running a spiral wound membrane element, contaminants contained in the liquid can be dispersed and inhibited from adhering to the membrane surface of the spiral wound membrane element by supplying ultrasonic vibration to the liquid being in contact with the separation membrane surface of the spiral wound membrane element. The spiral wound membrane element is also vibrated, whereby contaminants adhering to the membrane surface of the spiral wound membrane element can be separated.

Thus, the spiral wound membrane element can be stably run continuously over a long period.

In washing, a washing liquid is introduced from at least one opening end of the perforated hollow pipe. This washing liquid is guided into the envelope separation membrane from the outer peripheral surface of the perforated hollow pipe, and permeated through the separation membrane in a direction opposite to that in filtration. Thus, the separation membrane is subjected to back wash reverse filtration, so that contaminants deposited on the membrane surface of the separation membrane are separated from the separation membrane.

In this case, the separation membrane can be subjected to back wash reverse filtration with the back pressure higher than 0.05 MPa and not more than 0.3 MPa, whereby a necessary amount of the washing liquid can be fed in a short time. Thus, the contaminants deposited on the membrane surface of the separation membrane can be effectively removed. Consequently, stable filtration running can be performed while maintaining a high permeate flux over a long period also in dead end filtration readily causing deposition of contaminants on the membrane surface.

According to the aforementioned method of running a spiral wound membrane element, as hereinabove described, filtration can be so stably performed that a permeated liquid can be efficiently obtained. Further, no large pump may be employed for feeding the raw liquid but the scale of the system can be reduced. Thus, the system cost is reduced.

The separation membrane may be formed by bonding a permeable membrane body to a surface of a porous sheet material, and the permeable membrane body may be bonded to the surface of the porous sheet material in an anchored state.

In such a separation membrane, bonding between the porous sheet material and the permeable membrane body is reinforced to improve the back pressure strength of the separation membrane. Thus, the spiral wound membrane element can be sufficiently subjected to back wash reverse filtration with the back pressure higher than 0.05 MPa and not more than 0.3 MPa without breaking the separation membrane of the spiral wound membrane element.

In particular, the back pressure strength of the separation membrane is preferably at least 0.2 MPa. Thus, back wash reverse filtration with a high back pressure is so enabled that stable membrane separation can be performed over a long period by sufficiently washing the separation membrane.

In particular, the porous sheet material is preferably made of woven fabric, nonwoven fabric, a mesh net or a foaming sintered sheet of synthetic resin.

Further, the porous sheet material is preferably made of nonwoven fabric having a thickness of at least 0.08 mm and not more than 0.15 mm and density of at least 0.5 $g/cm^3$ and not more than 0.8 $g/cm^3$.

Thus, back pressure strength of at least 0.2 MPa can be obtained and increase of permeation resistance as well as separation of the permeable membrane body can be prevented while ensuring strength for serving as a reinforcing sheet.

According to a further aspect of the present invention, a method of running a spiral wound membrane module, comprising a pressure vessel and one or a plurality of spiral wound membrane elements stored in the pressure vessel with each spiral wound membrane element including an envelope separation membrane wound on the outer peripheral surface of a perforated hollow pipe and allowing back wash reverse filtration with a back pressure higher than 0.05 MPa and not more than 0.3 MPa, comprises a step of diffusing bubbles into a liquid stored in the pressure vessel.

According to this method of running a spiral wound membrane module, bubbles are diffused into the liquid stored in the pressure vessel to form a flow of diffused air on the separation membrane surface of the spiral wound membrane element. Thus, contaminants contained in the liquid can be inhibited from adhering to the membrane surface of the spiral wound membrane element. Further, contaminants adhering to the membrane surface of the spiral wound membrane element can be separated.

The step of diffusing bubbles into the liquid may include a step of feeding a raw liquid from an end of the spiral wound membrane element while diffusing bubbles into the raw liquid and taking out a permeated liquid from at least one opening end of the perforated hollow pipe.

In this case, the membrane surface of the spiral wound membrane element captures contaminants contained in the raw liquid.

Bubbles are diffused into the raw liquid to form a flow of diffused air on the separation membrane surface of the spiral wound membrane element. Thus, contaminants contained in the raw liquid can be inhibited from adhering to the membrane surface of the spiral wound membrane element, while contaminants adhering to the inner part of the spiral wound membrane module, particularly to the membrane surface of the spiral wound membrane element, can be separated.

The step of diffusing bubbles into the liquid may include a step of introducing a washing liquid from at least one opening end of the perforated hollow pipe and discharging the washing liquid from at least one end of the spiral wound membrane element thereby diffusing bubbles into the washing liquid while performing back wash reverse filtration on the separation membrane with a back pressure higher than 0.05 MPa and not more than 0.3 MPa in washing.

In washing, the washing liquid is introduced from at least one opening end of the perforated hollow pipe. This washing liquid is guided into the envelope separation membrane from the outer peripheral surface of the perforated hollow pipe, and permeated through the separation membrane in a direction opposite to that in filtration. Thus, the separation membrane is subjected to back wash reverse filtration, so that contaminants deposited on the membrane surface of the separation membrane are separated from the separation membrane.

In this case, the separation membrane is subjected to back wash reverse filtration with the back pressure higher than 0.05 MPa and not more than 0.3 MPa, whereby a necessary amount of the washing liquid can be fed in a short time. Thus, the contaminants deposited on the membrane surface of the separation membrane can be effectively removed. Consequently, stable filtration running can be performed while maintaining a high permeate flux over a long period also in dead end filtration readily causing deposition of contaminants on the membrane surface.

Bubbles are diffused into the washing liquid to form a flow of diffused air on the separation membrane surface of the spiral wound membrane element. Thus, contaminants adhering to the inner part of the spiral wound membrane module, particularly to the membrane surface of the spiral wound membrane element, can be more effectively separated and the separated contaminants can be inhibited from adhering to the membrane surface of the spiral wound membrane element.

The step of diffusing bubbles into the liquid includes a step of axially feeding a raw liquid or a washing liquid through the spiral wound membrane element and diffusing bubbles into the raw liquid or the washing liquid in flushing.

Thus, contaminants adhering to the inner part of the spiral wound membrane module, particularly to the membrane surface of the spiral wound membrane element, can be readily separated and the separated contaminants can be readily and reliably discharged.

The step of diffusing bubbles into the liquid may include a step of diffusing bubbles into a raw liquid or a washing liquid present in the pressure vessel when stopping running.

In this case, a flow of diffused air is formed on the separation membrane surface of the spiral wound membrane element. Thus, contaminants contained in the raw liquid or the washing liquid can be inhibited from adhering to the membrane surface of the spiral wound membrane element, while contaminants adhering to the inner part of the spiral wound membrane element, particularly to the membrane surface of the spiral wound membrane element, can be separated.

The aforementioned method of running a spiral wound membrane module may further comprise a step of continuously or intermittently feeding a partial raw liquid axially through the spiral wound membrane element and taking out the partial raw liquid from the pressure vessel.

In this case, partial contaminants contained in the raw liquid and contaminants separated from the membrane surface of the spiral wound membrane element can be readily and reliably discharged from the spiral wound membrane module, and the contaminants contained in the raw liquid can be further inhibited from adhering to the membrane surface of the spiral wound membrane element. Thus, the spiral wound membrane module can be further stably run continuously over a long period.

The aforementioned method of running a spiral wound membrane module may further comprise a step of returning at least part of the raw liquid taken out from the pressure vessel to a feeding side again.

According to a further aspect of the present invention, a spiral wound membrane module comprises a pressure vessel having a raw liquid inlet and a raw liquid outlet, one or a plurality of spiral wound membrane elements stored in the pressure vessel, an air diffuser diffusing bubbles into a liquid stored in the pressure vessel and a circulation system returning a raw liquid taken out from the pressure vessel through the raw liquid outlet to the raw liquid inlet, while each spiral wound membrane element includes a perforated hollow pipe and an envelope separation membrane wound on the outer peripheral surface of the perforated hollow pipe and allows back wash reverse filtration with a back pressure higher than 0.05 MPa and not more than 0.3 MPa.

In this spiral wound membrane module, the air diffuser continuously or intermittently diffuses bubbles into the raw liquid or the washing liquid stored in the pressure vessel. Thus, a flow of diffused air is formed on the surface of the separation membrane of the spiral wound membrane element in the spiral wound membrane module, whereby contaminants adhering to the membrane surface of the spiral wound membrane element can be separated. Further, contaminants contained in the raw liquid or the washing liquid and the separated contaminants can be inhibited from adhering to the membrane surface of the spiral wound membrane element.

In running, a flow of the raw liquid is formed along the axial direction of the spiral wound membrane element, so that part of the contaminants contained in the raw liquid and the separated contaminants can be readily and reliably discharged from the spiral wound membrane module, and the contaminants contained in the raw liquid as well as the separated contaminants can be further inhibited from adhering to the membrane surface of the spiral wound membrane element.

In washing, the washing liquid is introduced from at least one opening end of the perforated hollow pipe. The washing liquid is guided into the envelope separation membrane from the outer peripheral surface of the perforated hollow pipe and permeated through the separation membrane in a direction opposite to that in filtration. Thus, the separation membrane is subjected to back wash reverse filtration so that contaminants deposited on the membrane surface of the separation membrane are separated from the separation membrane.

In this case, the separation membrane is subjected to back wash reverse filtration with the back pressure higher than 0.05 MPa and not more than 0.3 MPa, whereby a necessary amount of the washing liquid can be fed in a short time. Thus, the contaminants deposited on the membrane surface of the separation membrane can be effectively removed. Consequently, stable filtration running can be performed while maintaining a high permeate flux over a long period also in dead end filtration readily causing deposition of contaminants on the membrane surface.

Thus, the spiral wound membrane module implements stable performance.

The raw liquid taken out from the pressure vessel through the raw liquid outlet may be returned to the raw liquid inlet again by a circulation system.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 18 is a schematic sectional view showing still another exemplary method of running a spiral wound membrane module according to the present invention.

DESCRIPTION OF THE PREFERRED EMBODIMENTS

Figure 1:
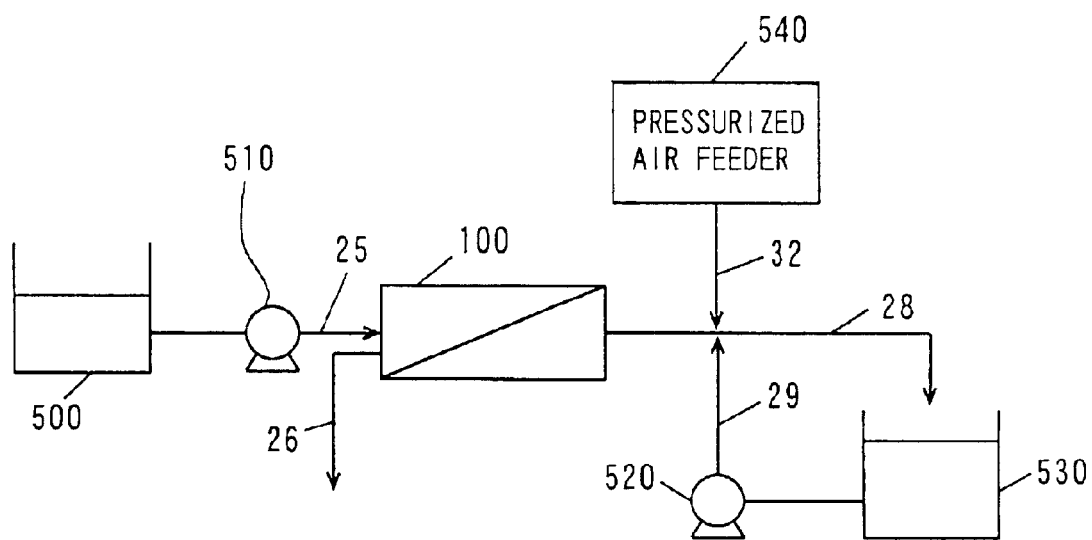
FIG. 1 is a model diagram showing a treatment system according to an embodiment of the present invention.

FIG. 1 is a model diagram showing a treatment system according to an embodiment of the present invention.

As shown in FIG. 1, a raw water tank 500 feeds raw water to a raw water inlet of a spiral wound membrane module 100 by a pump 510 through a pipe 25. Permeate derived from a permeate outlet of the spiral wound membrane module 100 is fed to a permeate tank 530 through a pipe 28. Waste water taken out from the spiral wound membrane module 100 is discharged from the system through a pipe 26. A spiral wound membrane element allowing back wash reverse filtration at 0.05 to 0.3 MPa is employed for this spiral wound membrane module 100.

The treatment system according to this embodiment performs operations of air injection, back wash reverse filtration and flushing as recovery of a filtration velocity. This recovery of the filtration velocity is described later.

In air injection, a pressurized air feeder 540 formed by a compressor or the like injects air of not more than 0.3 MPa into the permeate outlet of the spiral wound membrane module 100 through a pipe 32. In back wash reverse filtration, the permeate tank 530 feeds the permeate to the permeate outlet of the spiral wound membrane module 100 as a washing liquid by a pump 520 through a pipe 29.

In this embodiment, the pump 510 and the pipe 25 correspond to the first raw liquid feeding system, the pipe 28 corresponds to the permeated liquid delivery system, and the pressurized air feeder 540 and the pipe 32 correspond to the gas injection system. The pump 510 and the pipes 25 and 26 form the second raw liquid feeding system.

Figure 2:
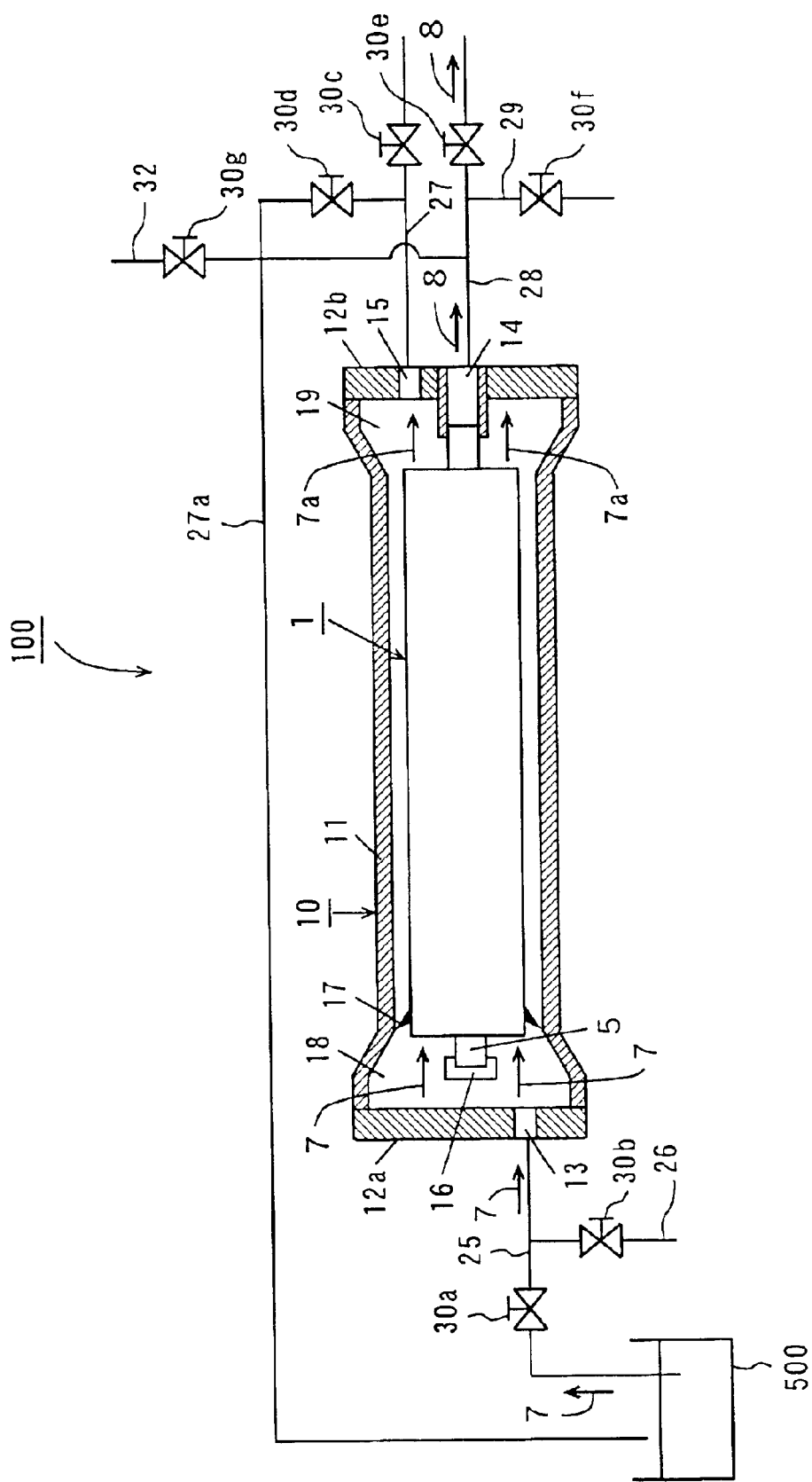
FIG. 2 is a schematic sectional view showing detailed structures of a spiral wound membrane module and pipes employed in the treatment system shown in FIG. 1 and a running method in filtration.

FIG. 2 is a schematic sectional view showing detailed structures of the spiral wound membrane module 100 and the pipes 25, 26, 28, 29 and 32 employed in the treatment system shown in FIG. 1 and a running method in filtration. FIG. 2 does not illustrate the pumps 510 and 520 shown in FIG. 1.

As shown in FIG. 2, the spiral wound membrane module 100 is formed by storing a spiral wound membrane element 1 in a pressure vessel (pressure-resistant vessel) 10. The pressure vessel 10 is formed by a tubular case 11 and a pair of end plates 12a and 12b. The first end plate 12a is formed with a raw water inlet 13, and the second end plate 12b is formed with a raw water outlet 15. A permeate outlet 14 is provided on the central portion of the second end plate 12b. The structure of the pressure vessel 10 is not restricted to that shown in FIG. 2, but a pressure vessel of a side entry shape having a tubular case provided with a raw water inlet and a raw water outlet may alternatively be employed as described later.

The spiral wound membrane element 1 having a packing 17 mounted in the vicinity of an end of its outer peripheral surface is charged in the tubular case 11, and both opening ends of the tubular case 11 are sealed with the end plates 12a and 12b respectively. A first opening end of a water collection pipe 5 is engaged with the permeate outlet 14 of the end plate 12b, while an end cap 16 is mounted on a second opening end thereof. The packing 17 separates the internal space of the pressure vessel 10 into a first liquid chamber 18 and a second liquid chamber 19.

The raw water inlet 13 of the spiral wound membrane module 100 is connected to the raw water tank 500 through the pipe 25. A valve 30a is inserted in the pipe 25, and the pipe 26 having a valve 30b inserted therein is connected downstream the valve 30a. A pipe 27 having a valve 30c inserted therein is connected to the raw water outlet 15, and a pipe 27a having a valve 30d inserted therein is connected upstream the valve 30c of the pipe 27. The raw water outlet 15 is connected to the raw water tank 500 through the pipe 27a. The pipe 28 having a valve 30e inserted therein is connected to the permeate outlet 14, and the pipes 29 and 32 having valves 30f and 30g inserted therein respectively are connected upstream the valve 30*e*. The pipe 32 is connected to the pressurized air feeder 540 shown in FIG. 1.

Figure 6:
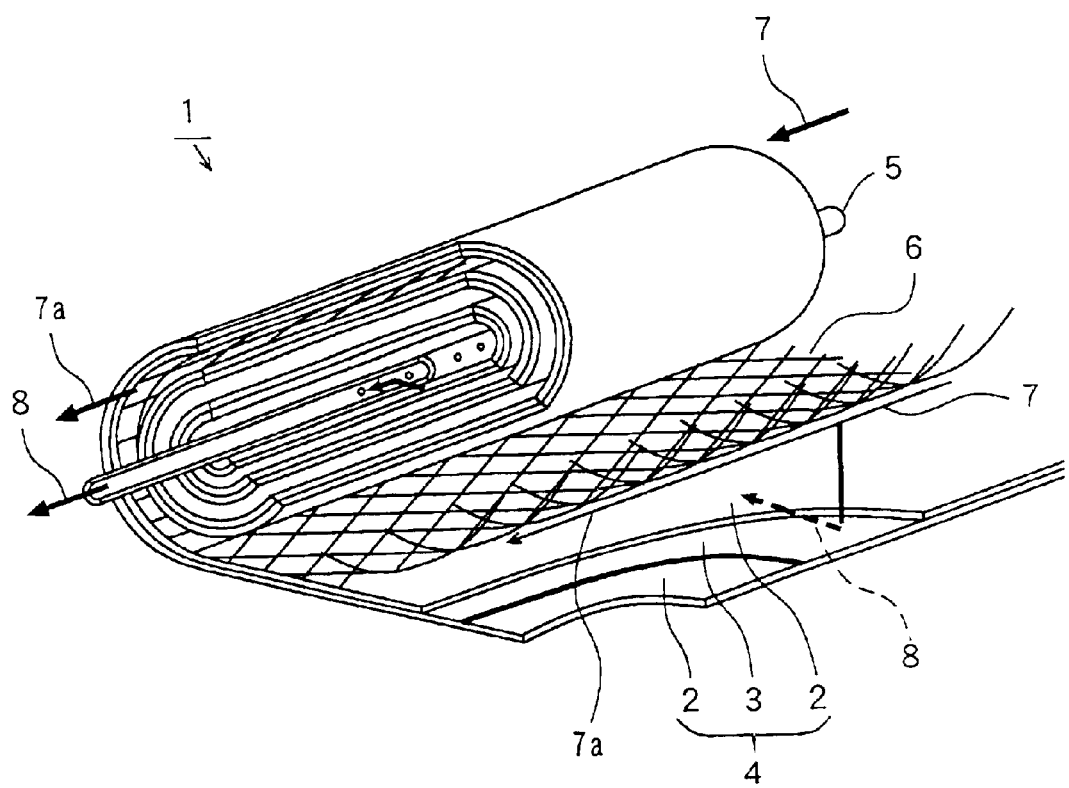
FIG. 6 is a partially fragmented perspective view of a spiral wound membrane element employed for the spiral wound membrane module shown in FIG. 1.

FIG. 6 is a partially fragmented perspective view of the spiral wound membrane element 1 employed in the spiral wound membrane module 100 shown in FIG. 2.

As shown in FIG. 6, the spiral wound membrane element 1 is formed by superposing separation membranes 2 on both sides of a permeate spacer 3 formed by a net of synthetic resin and bonding the former to the latter on three sides thereby defining an envelope-like membrane (baggy membrane) 4, mounting an opening part of the envelope-like membrane 4 on the water collection pipe 5 and spirally winding the envelope-like membrane 4 on the outer peripheral surface of the water collection pipe 5 along with a raw water spacer 6 formed by a net of synthetic resin. The outer peripheral surface of the spiral wound membrane element 1 is covered with a sheath member.

The spiral wound membrane element 1 can be subjected to back wash reverse filtration with a back pressure of 0.05 to 0.3 MPa due to the separation membranes 2 having a structure described later.

In filtration, the valves 30*a* and 30*e* of the pipes 25 and 28 are opened and the valves 30*b*, 30*c*, 30*d*, 30*f* and 30*g* of the pipes 26, 27, 27*a*, 29 and 32 are closed as shown in FIG. 2.

Raw water 7 taken from the raw water tank 500 is fed into the pressure vessel 10 from the raw water inlet 13 through the pipe 25. In the spiral wound membrane module 100, the fed raw water 7 is introduced into the first liquid chamber 18 of the pressure vessel 10 from the raw water inlet 13, and further fed into the spiral wound membrane element 1 from a first end thereof.

As shown in FIG. 6, the raw water 7 fed from the first end surface of the spiral wound membrane element 1 linearly flows toward a second end surface in a direction (axial direction) parallel to the water collection pipe 5 along the raw water spacer 6. In the process of this flow of the raw water 7 along the raw water spacer 6, part of the raw water 7 is permeated through the separation membranes 2 due to the pressure difference between the raw water side and the permeate side. This permeate 8 flows into the water collection pipe 5 along the permeate spacer 3, and is discharged from an end of the water collection pipe 5. The remaining raw water 7*a* not permeated through the separation membranes 2 is discharged from the second end surface of the spiral wound membrane element As shown in FIG. 2, the permeate 8 discharged from the end of the water collection pipe 5 is taken out from the pressure vessel 10 from the permeate outlet 14 through the pipe 28. The raw water 7*a* discharged from the second end surface of the spiral wound membrane element 1 is guided into the second liquid chamber 19. In this case, the valve 30*c* of the pipe 27 connected with the raw water outlet 15 and the valve 30*d* of the pipe 27*a* are closed, and hence permeation through the separation membranes 2 is prompted in the spiral wound membrane element 1 for performing dead end filtration.

In the aforementioned filtration process, suspended, colloidal or dissolved matter contained in the raw water 7 is deposited on the membrane surfaces of the separation membranes 2 of the spiral wound membrane element 1 as contaminants. In particular, contaminants are readily deposited on the membrane surfaces of the separation membranes 2 in dead end filtration. Such deposition of contaminants results in reduction of the water permeation velocity, and hence the contaminants are removed by recovery of the filtration velocity described below.

Figure 3:
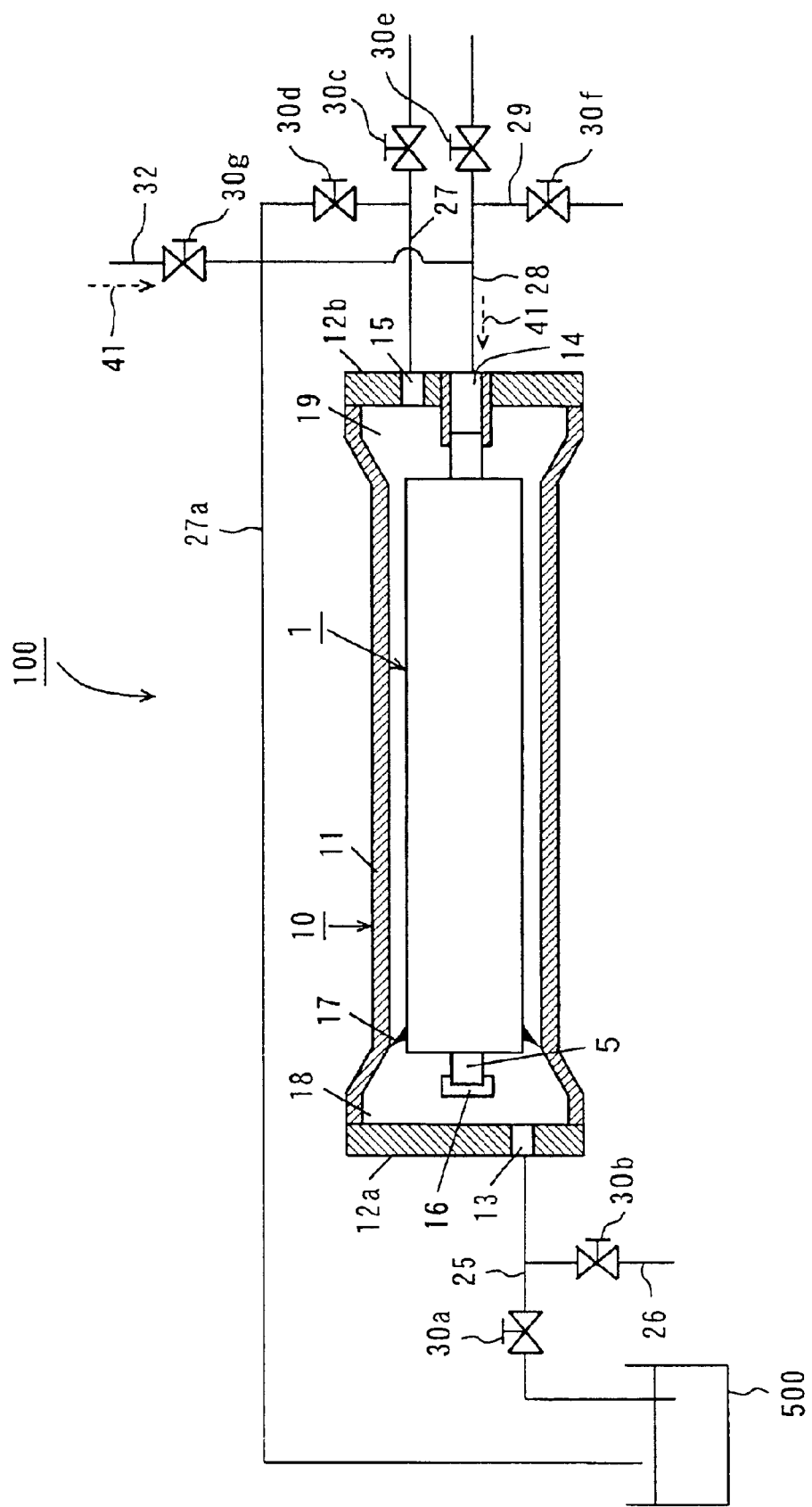
FIG. 3 is a schematic sectional view showing an operation of air injection in recovery of a filtration velocity.
Figure 4:
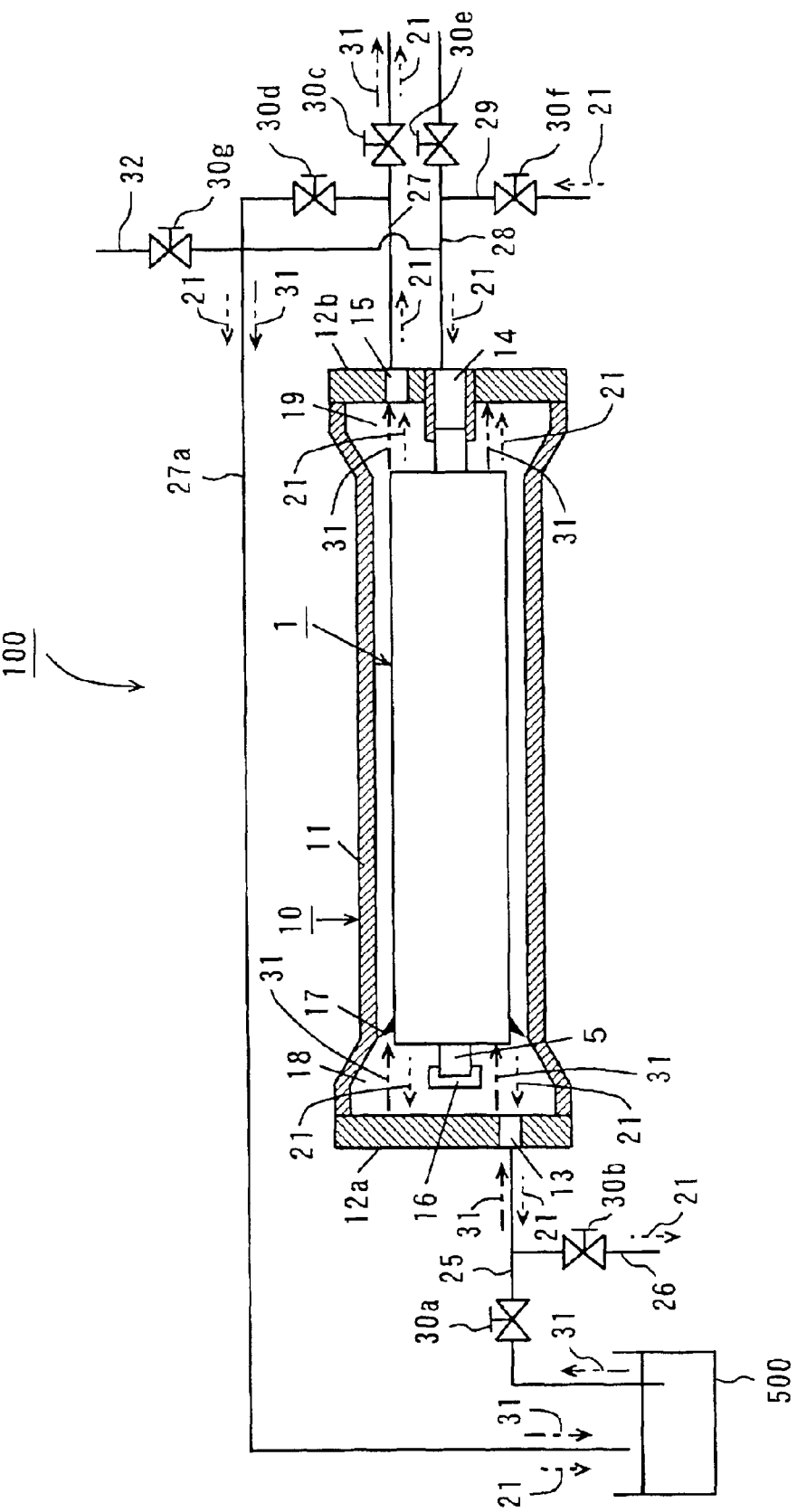
FIG. 4 is a schematic sectional view showing operations of back wash reverse filtration and flushing in recovery of the filtration velocity.

FIG. 3 is a schematic sectional view showing air injection in recovery of the filtration velocity, and FIG. 4 is a schematic sectional view showing back wash reverse filtration and flushing in recovery of the filtration velocity.

In recovery of the filtration velocity, the valves 30*a*, 30*b*, 30*c*, 30*d*, 30*e* and 30*f* of the pipes 25, 26, 27, 27*a*, 28 and 29 are closed and the valve 30*g* of the pipe 32 is opened as shown in FIG. 3, for performing air injection. In this air injection, the pressurized air feeder 540 shown in FIG. 1 feeds pressurized air 41 to an opening end of the water collection pipe 5 from the permeate outlet 14 through the pipes 32 and 28, for introducing the air 41 into the water collection pipe 5. The pressure of the air 41 is set to not more than 0.3 MPa.

The air 41 introduced into the water collection pipe 5 is guided into the separation membranes 2 from the outer peripheral surface of the water collection pipe 5, for applying an effective back pressure to the overall separation membranes 3. Thus, the contaminants deposited on the membrane surfaces of the separation membranes 2 are floated from the separation membranes 2. Therefore, the contaminants deposited on the membrane surfaces of the separation membranes 2 can be effectively discharged from the system by back wash reverse filtration and flushing.

In this case, the spiral wound membrane element 1 can be subjected to back wash reverse filtration with a back pressure of 0.05 to 0.3 MPa, and hence the injected air 41 of not more than 0.3 MPa does not damage the separation membranes 2 by separating the same from a separation membrane support. Further, the bubble point of the separation membranes 2 is at least 0.3 MPa, and hence pores of the separation membranes 2 are not replaced with the injected air 41 of not more than 0.3 MPa to reduce the permeate flow rate.

Then, the valve 30*e* of the pipe 28 is first opened to relieve the water collection pipe 5 from the pressure applied by the air 41, and thereafter the valves 30*a*, 30*e*, 30*d* and 30*g* o the pipes 25, 28, 27*a* and 32 are closed while the valves 30*b*, 30*f* and 30*c* of the pipes 26, 29 and 27 are opened for performing back wash reverse filtration, as shown in FIG. 4.

In back wash reverse filtration, wash water 21 is fed to the opening end of the water collection pipe 5 from the permeate outlet 14 through the pipes 29 and 28, and introduced into the water collection pipe 5. The wash water 21 is prepared from the permeate 8, for example. The wash water 21 introduced into the water collection pipe 5 is guided into the separation membranes 2 from the outer peripheral surface of the water collection pipe 5, and permeated through the separation membranes 2 in a direction opposite to that in filtration. At this time, contaminants deposited on the membrane surfaces of the separation membranes 2 are separated from the separation membranes 2. The outer peripheral surface of the spiral wound membrane element 1 is covered with the sheath member, and hence the wash water 21 permeated through the separation membranes 2 axially flows through the spiral wound membrane element 1 along the raw water spacer 6, to be discharged into the first liquid chamber 18 and the second liquid chamber 19 from both ends of the spiral wound membrane element 1. Further, the wash water 21 is taken out from the raw water inlet 13 and the raw water outlet 15 through the pipes 26 and 27 respectively.

In this case, pressures on the sides of the permeate outlet 14, the raw water inlet 13 and the raw water outlet 15 are so set as to apply a back pressure of 0.05 to 0.3 MPa to the separation membranes 2. Thus, a necessary amount of the wash water 21 can be fed in a short time for effectively separating the contaminants deposited on the membrane surfaces of the separation membranes 2. Further, the separated contaminants can be inhibited from being captured by the raw water spacer 6 before the same are discharged from the end of the spiral wound membrane element 1, to be effectively removed.

While the wash water 21 taken out from the raw water inlet 13 is totally discharged from the system as waste water in this embodiment, the wash water 21 may alternatively be partially discharged from the system and partially recycled as the raw water 7. For example, a further pipe may be provided downstream the valve 30b of the pipe 26 and connected to the raw water tank 500, thereby partially returning the wash water 21 to the raw water tank 500.

While the wash water 21 taken out from the raw water outlet 15 is totally discharged from the system as waste water in this embodiment, the wash water 21 may alternatively be partially discharged from the system as waste water and partially recycled as the raw water 7. For example, the valves 30c and 30d of the pipes 27 and 27a may be opened for partially returning the wash water 21 to the raw water tank 500 through the pipe 27a.

While the wash water 21 is discharged from both ends of the spiral wound membrane element 1 in back wash reverse filtration and taken out from the raw water inlet 13 and the raw water outlet 15 through the pipes 26 and 27 respectively in the example shown in FIG. 4, the pressures on the sides of the permeate outlet 14 and the raw water inlet 13 may alternatively be so set that the wash water 21 is discharged into the first liquid chamber 18 from the first end of the spiral wound membrane element 1 and taken out from the raw water inlet 13 through the pipe 26. In this case, the valve 30c of the pipe 27 as well as the raw water outlet 15 are closed. Further alternatively, the pressures on the sides of the permeate outlet 14 and the raw water outlet 15 may be so set that the wash water 21 is discharged into the second liquid chamber 19 from the second end of the spiral wound membrane element 1 and taken out from the raw water outlet 15 through the pipe 27. In this case, the valve 30b of the pipe 26 as well as the raw water inlet 13 are closed.

After back wash reverse filtration is performed in the aforementioned manner, the valves 30b and 30f of the pipes 26 and 29 are closed and the valve 30a of the pipe 25 is opened. Thus, raw water 31 taken from the raw water tank 500 is fed into the pressure vessel 10 from the raw water inlet 13 through the pipe 25, and introduced into the first liquid chamber 18. The raw water 31 is fed from the first end of the spiral wound membrane element 1 and axially flows through the spiral wound membrane element 1 along the raw water spacer 6, to be thereafter discharged from the second end. Thus, contaminants separated from the separation membranes 2 are carried from the first end toward the second end of the spiral wound membrane element 1 along with the raw water 31, and discharged into the second liquid chamber 19 from the second end of the spiral wound membrane element 1 along with the wash water 21 remaining in the spiral wound membrane element 1. Further, the contaminants are taken out from the pressure vessel 10 from the raw water outlet 15 through the pipe 27 along with the raw water 31.

Thus, the contaminants separated from the separation membranes 2 in the spiral wound membrane element 1 can be quickly discharged from the system by feeding the raw water 31 in the same direction as that for feeding the raw water in filtration after the back wash reverse filtration. Therefore, the contaminants separated from the separation membranes 2 can be prevented from adhering to the separation membranes 2 again.

According to the aforementioned recovery of the filtration velocity, contaminants deposited on the separation membranes 2 in filtration can be effectively removed, whereby stable running can be performed without reducing the permeate flux over a long period also in dead end filtration readily causing deposition of contaminants on the membrane surfaces.

While back wash reverse filtration is performed after air injection, the former may alternatively be performed before the latter. Further alternatively, back wash reverse filtration may be performed in parallel with air injection. For example, the valves 30b, 30c, 30f and 30g of the pipes 26, 27, 29 and 32 may be simultaneously opened in recovery of the filtration velocity, for feeding the air 41 and the wash water 21 from the permeate side. In this case, an effect similar to that attained by performing back wash reverse filtration after air injection as described above can be attained.

While the raw water 31 is axially fed after back wash reverse filtration in this embodiment, the raw water 31 may alternatively be axially fed in parallel with back wash reverse filtration. For example, the valves 30a, 30b, 30c and 30f of the pipes 25, 26, 27 and 29 may be simultaneously opened in washing for feeding the wash water 21 from the permeate side while feeding the raw water 31 from the raw water side. In this case, an effect similar to that attained by feeding the raw water 31 after back wash reverse filtration as described above can be attained.

While the raw water 31 is fed from the raw water inlet 13 and taken out from the raw water outlet 15 in this embodiment, raw water may alternatively be fed from the raw water outlet 13 and taken out from the raw water inlet 13, to be fed through the spiral wound membrane element 1 in a direction opposite to that in filtration. In this case, an effect similar to that attained by feeding the raw water 31 in the same direction as that in filtration as described above can be attained.

When the raw water is fed in the same direction as that in filtration, particularly contaminants deposited on a side closer to the second liquid chamber 19 of the spiral wound membrane element 1 can be readily removed and discharged. When the raw water is fed in the direction opposite to that in filtration, on the other hand, particularly contaminants deposited on a side closer to the first liquid chamber 18 of the spiral wound membrane element 1 can be readily removed and discharged.

Further alternatively, the raw water may be successively fed in the same direction as and in the opposite direction to that in filtration. In this case, contaminants distributed along the overall spiral wound membrane element 1 can be homogeneously removed and discharged.

While the raw water 31 taken out from the raw water outlet 15 is totally discharged from the system as waste water in this embodiment, the raw water 31 may alternatively be partially discharged from the system as waste water and partially recycled as the raw water 7. For example, the valves 30c and 30d of the pipes 27 and 27a may be opened for partially returning the raw water 31 to the raw water tank 500 through the pipe 27a.

According to the running method shown in FIGS. 2 to 4, as hereinabove described, contaminants deposited on the membrane surface of the spiral wound membrane element 1 can be so sufficiently removed that dead end filtration can be stably performed while maintaining a high permeate flux in the treatment system shown in FIG. 1 for efficiently obtaining the permeate 8. In this case, dead end filtration is performed and hence no large pump is required for feeding the raw water 7 but the scale of the system can be reduced. Thus, the system cost is reduced.

Figure 5:
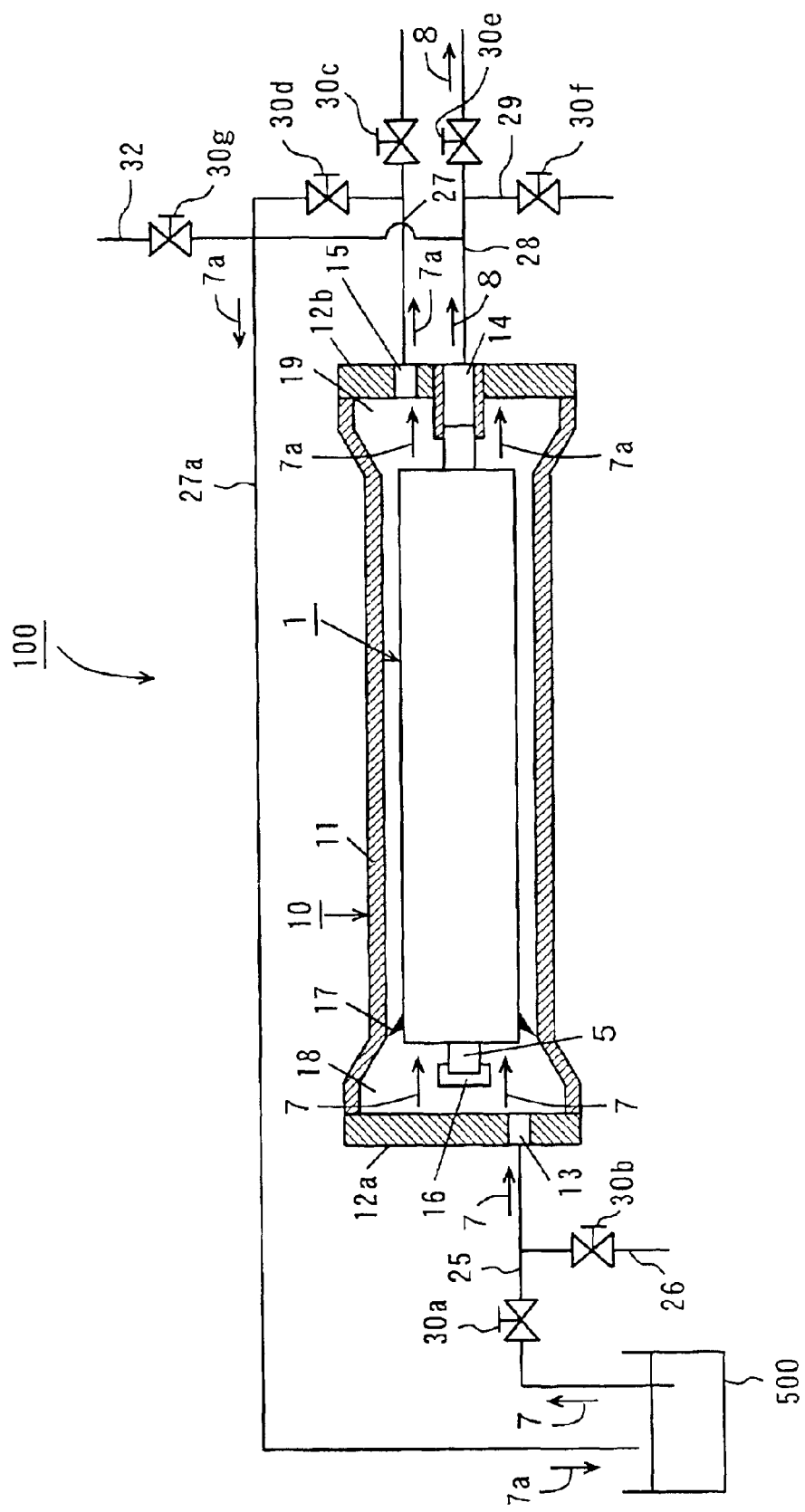
FIG. 5 is a schematic sectional view showing another exemplary method of running a spiral wound membrane module according to the present invention.

FIG. 5 is a schematic sectional view showing another exemplary method of running a spiral wound membrane module according to the present invention. The running method shown in FIG. 5 is employed in filtration of the spiral wound membrane module 100 shown in FIG. 2. In this example, a running method in recovery of a filtration velocity is similar to the aforementioned running method shown in FIGS. 3 and 4.

As shown in FIG. 5, the valves 30a, 30e and 30d of the pipes 25, 28 and 27 are opened and the valves 30b, 30c, 30f an 30g of the pipes 26, 27, 29 and 32 are closed in filtration.

In this case, the raw water 7 taken from the raw water tank 500 is introduced into the first liquid chamber 18 of the pressure vessel 10 from the raw water inlet 13 through the pipe 25, similarly to the example shown in FIG. 2. Further, the raw water 7 is fed into the spiral wound membrane element 1 from the first end thereof.

As shown in FIG. 6, partial raw water is permeated through the separation membranes 2 to flow into the water collection pipe 5, and discharged from the end of the water collection pipe 5 as the permeate 8 in the spiral wound membrane element 1. The remaining raw water 7a not permeated through the separation membranes 2 is discharged from the second end surface of the spiral wound membrane element 1.

The permeate 8 discharged from the end of the water collection pipe 5 is taken out from the pressure vessel 10 from the permeate outlet 14 through the pipe 28, as shown in FIG. 5. The raw water 7a discharged from the second end surface of the spiral wound membrane element 1 is guided into the second liquid chamber 19 and thereafter taken out from the raw water outlet 15 through the pipe 27a, to be returned to the raw water tank 500. Thus, the spiral wound membrane module 100 is subjected to filtration while taking out the partial raw water 7a from the raw water outlet 15. Thus, retention of any liquid can be suppressed in the clearance between the outer peripheral surface of the spiral wound membrane element 1 and the inner peripheral surface of the pressure vessel 10. Further, an axial flow of the raw water from the first end toward the second end is formed in the spiral wound membrane element 1, whereby partial contaminants can be discharged from the pressure vessel 10 along with the raw water 7a while suppressing sedimentation of contaminants in the raw water.

While the valve 30d is regularly opened for taking out the raw water 7a in the above description, the valve 30d may alternatively be intermittently opened for taking out the raw water 7a. Also in this case, contaminants can be inhibited from adhering to the separation membranes 2 similarly to the case of regularly taking out the raw water 7a.

While the raw water 7a taken out from the pressure vessel 10 is totally returned to the raw water tank 500 in the above description, the taken out raw water 7a may alternatively be partially discharged from the system. For example, the valves 30d and 30c may be opened for partially discharging the raw water 7a from the system through the pipe 27.

Also in this example, the air 41 is injected by the running method shown in FIG. 3 and back wash reverse filtration as well as introduction of the raw water 31 are performed by the running method shown in FIG. 4 in recovery of the filtration velocity. Thus, contaminants deposited on the separation membranes 2 in filtration can be effectively removed.

According to this running method, as hereinabove described, contaminants deposited on the membrane surfaces can be so sufficiently removed that stable running can be performed without reducing the permeate flux over a long period.

Particularly in this example, contaminants can be partially discharged from the pressure vessel 10 along with the raw water 7a while inhibiting contaminants contained in the raw water from sedimenting on the membrane surfaces by taking out the partial raw water 7a from the pressure vessel 10 in filtration as shown in FIG. 5, whereby more stable filtration running can be performed. In this case, the raw water 7a taken out from the raw water outlet 15 is circulated through the pipe 27a, whereby the permeate 8 can be obtained with high recovery. Further, no large pump is required for feeding the raw water 7 but the scale of the system can be reduced. Thus, the system cost is reduced.

While the spiral wound membrane module 100 comprising the single spiral wound membrane element 1 is run in the above example, the inventive running method is also applicable to a spiral wound membrane module comprising a plurality of spiral wound membrane elements.

Figure 7:
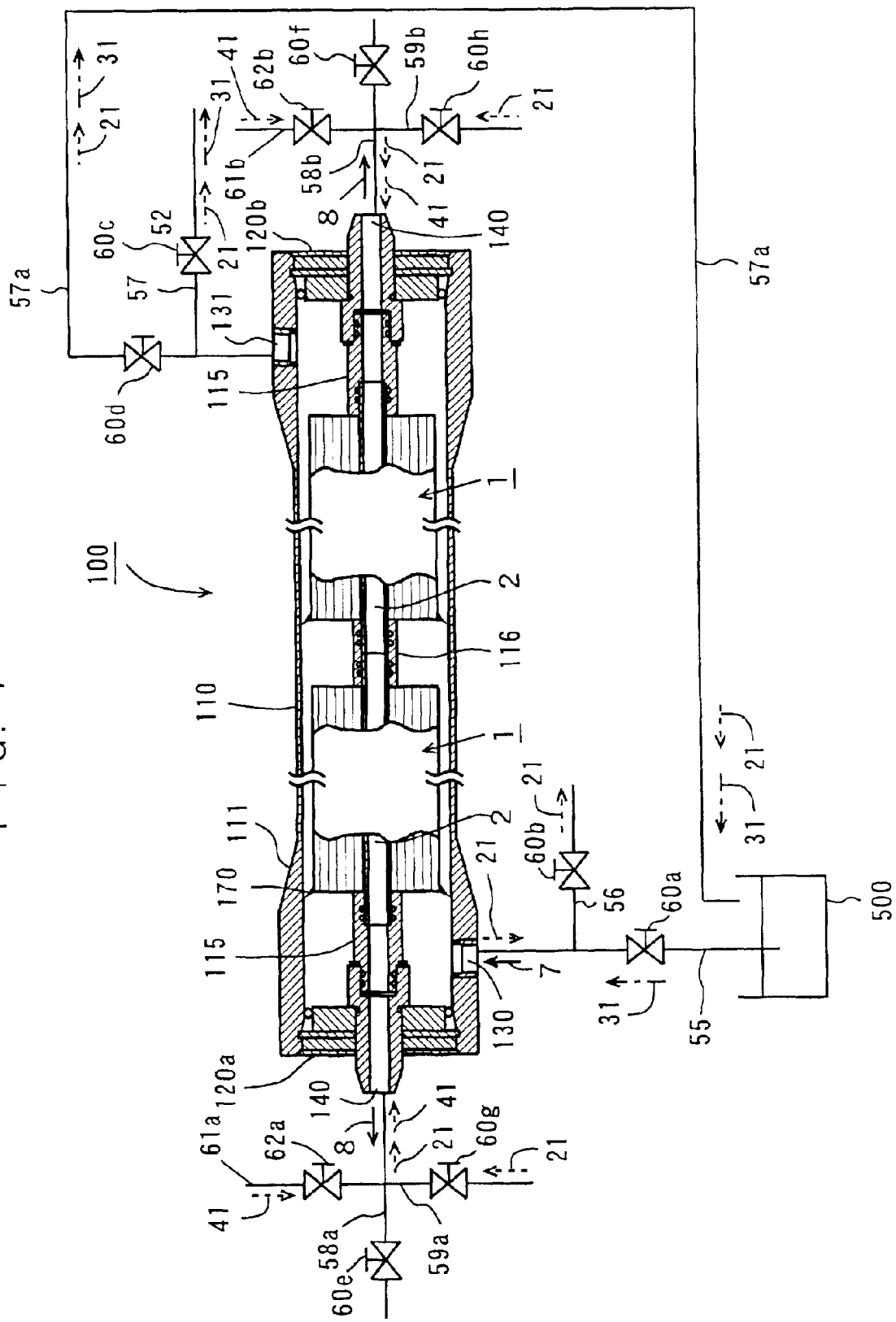
FIG. 7 is a sectional view showing still another exemplary method of running a spiral wound membrane module according to the present invention.

FIG. 7 is a schematic sectional view showing still another exemplary method of running a spiral wound membrane module according to the present invention.

As shown in FIG. 7, a spiral wound membrane module 100 according to this example is formed by storing a plurality of spiral wound membrane elements 1 in a pressure vessel 110. The pressure vessel 110 is formed by a tubular case 111 and a pair of end plates 120a and 120b. The tubular case 111 is formed with a raw water inlet 130 and a raw water outlet 131 on its bottom and upper portions respectively. Thus, the pressure vessel 110 has a side entry shape. The raw water outlet 131 is also employed for deairing. Permeate outlets 140 are provided on the central portions of the end plates 120a and 120b.

The plurality of spiral wound membrane elements 1 having water collection pipes 5 serially connected with each other by an interconnector 116 are stored in the tubular case 111, and both opening ends of the tubular case 111 are sealed with the end plates 120a and 120b respectively. The spiral wound membrane elements 1 are identical to the spiral wound membrane element 1 shown in FIG. 5. Single ends of the water collection pipes 5 of the endmost spiral wound membrane elements 1 are engaged with the permeate outlets 140 of the end plates 120a and 120b through adapters 115 respectively. Packings 170 are mounted in the vicinity of single ends of the outer peripheral surfaces of the spiral wound membrane elements 1, to separate the internal space of the pressure vessel 110 into a plurality of liquid chambers.

The raw water inlet 130 of the spiral wound membrane module 100 is connected to a raw water tank 500 through a pipe 55. A valve 60a is inserted in the pipe 55, and a pipe 56 having a valve 60b inserted therein is connected downstream the valve 60a. A pipe 57 having a valve 60c inserted therein is connected to the raw water outlet 131, and a pipe 57a having a valve 60d inserted therein is connected upstream the valve 60c of the pipe 57. The raw water outlet 131 is connected to the raw water tank 500 through the pipe 57a. A pipe 58a having a valve 60e inserted therein is connected to the permeate outlet 140 of the end plate 120a, and pipes 59a and 61a having valves 60g and 62a inserted therein respectively are connected upstream the valve 60e. A pipe 58b having a valve 60f inserted therein is connected to the permeate outlet 140 of the end plate 120b, and pipes 59b and 61b having valves 60h and 62b inserted therein are connected upstream the valve 60f.

In filtration of the spiral wound membrane module 100, the valves 60a, 60e and 60f of the pipes 55, 58a and 58b are opened and the valves 60b, 60g, 60h, 60c, 60d, 62a and 62b of the pipes 56, 59a, 59b, 57, 57a, 61a and 61b are closed.

Raw water 7 taken from the raw water tank 500 is fed into the pressure vessel 110 from the raw water inlet 130 through the pipe 55. The raw water 7 fed from the raw water inlet 130 into the spiral wound membrane module 100 is introduced into the endmost spiral wound membrane element 1 closer to the end plate 120a from the first end surface thereof. In this spiral wound membrane element 1, part of the raw water 7 is permeated through separation membranes 2 to flow into the water collection pipe 5 and discharged from an end of the water collection pipe 5 as permeate 8, as shown in FIG. 5. On the other hand, the remaining raw water 7a not permeated through the separation membranes 2 is discharged from the second end surface. The discharged raw water 7a is introduced into the subsequent spiral wound membrane element 1 from the first end surface thereof, and separated into permeate 8 and raw water 7a similarly to the above. Thus, membrane separation is performed in each of the plurality of spiral wound membrane elements 1 serially connected with each other. In this case, the valves 60c and 60d of the pipes 57 and 57a are closed and hence permeation through the separation membranes 2 is prompted in each spiral wound membrane element 1, for performing dead end filtration in the spiral wound membrane module 100.

In the aforementioned filtration process, contaminants contained in the raw water 7 are deposited on the membrane surfaces of the separation membranes 2 of each spiral wound membrane element 1. Particularly when the spiral wound membrane module 100 comprising the plurality of spiral wound membrane elements 1 as described above is subjected to dead end filtration, contaminants are readily deposited on the membrane surfaces of the separation membranes 2. Such deposition of the contaminants reduces the water permeation velocity, and hence the contaminants are removed by performing recovery of a filtration velocity as follows:

In recovery of the filtration velocity, the valves 60a, 60e, 60b, 60c, 60f, 60d, 60g and 60h of the pipes 55, 58a, 56, 57, 58b, 57a, 59a and 59b are closed and the valves 62a and 62b of the pipes 61a and 61b are opened for performing air injection. In this air injection, air 41 is supplied to first ends of the water collection pipes 5 closer to the end plate 120a from the permeate outlet 140 through the pipes 61a and 58a. Further, air 41 is supplied to second ends of the water collection pipes 5 closer to the end plate 120b from the permeate outlet 140 through the pipes 61b and 58b. Thus, the air 41 is introduced into the water collection pipes 5 from both ends thereof. The air 41 introduced into the water collection pipes 5 is guided into the separation membranes 2 from the outer peripheral surfaces of the water collection pipes 5 in the spiral wound membrane elements 1, to apply an effective back pressure to the overall separation membranes 2. Thus, contaminants deposited on the membrane surfaces of the separation membranes 2 are floated from the separation membranes 2. Therefore, the contaminants deposited on the membrane surfaces of the separation membranes 2 can be effectively discharged from the system by back wash reverse filtration and flushing.

Then, the valve 60f of the pipe 58b is opened for relieving the water collection pipes 5 from pressures applied by the air 41, and thereafter the valves 60a, 60e, 60f, 60d, 62a and 62b of the pipes 55, 58a, 58b, 57a, 61a and 61b are closed while the valves 60b, 60c, 60g and 60h of the pipes 56, 57, 59a and 59b are opened for performing back wash reverse filtration.

In back wash reverse filtration, wash water 21 is fed to the first ends of the water collection pipes 5 closer to the end plate 120a from the permeate outlet 140 through the pipes 59a and 58a. Further, wash water 21 is fed to the second ends of the water collection pipes 5 closer to the end plate 120b from the permeate outlet 140 through the pipes 59b and 58b. Thus, the wash water 21 is introduced into the water collection pipes 5 from both ends thereof. The wash water 21 introduced into the water collection pipes 5 is guided into the separation membranes 2 from the outer peripheral surfaces of the water collection pipes 5 in the spiral wound membrane elements 1, and permeated through the separation membranes 2 in a direction opposite to that in filtration. At this time, contaminants deposited on the membrane surfaces of the separation membranes 2 are separated from the separation membranes 2. The wash water 21 permeated through the separation membranes 2 axially flows through the spiral wound membrane elements 1 along raw water spacers 6, to be discharged from both ends of the spiral wound membrane elements 1. The discharged wash water 21 is taken out from the raw water inlet 130 and the raw water outlet 131 through the pipes 56 and 57 respectively.

In this case, pressures on the sides of the permeate outlets 140, the raw water inlet 130 and the raw water outlet 131 are so set as to apply a back pressure of 0.05 to 0.3 MPa to the separation membranes 2 of the spiral wound membrane elements 1. Thus, a necessary amount of the wash water 21 can be fed in a short time, for effectively separating the contaminants deposited on the membrane surfaces of the separation membranes 2. Further, the separated contaminants can be inhibited from being captured by the raw water spacers 6 before the same are discharged from the ends of the spiral wound membrane elements 1, to be effectively removed.

While the wash water 21 taken out from the raw water inlet 130 is totally discharged from the system as waste water in this example, the wash water 21 may alternatively be partially discharged from the system and partially recycled as the raw water 7. For example, a further pipe may be provided downstream the valve 60b of the pipe 56 and connected to the raw water tank 500, thereby partially returning the wash water 21 to the raw water tank 500.

While the wash water 21 taken out from the raw water outlet 131 is totally discharged from the system as waste water in this example, the wash water 21 may alternatively be partially discharged from the system as waste water and partially recycled as the raw water 7. For example, the valves 60c and 60d of the pipes 57 and 57a may be opened for partially returning the wash water 21 to the raw water tank 500 through the pipe 57a.

While the wash water 21 is taken out from the raw water inlet 130 and the raw water outlet 131 through the pipes 56 and 57 respectively in back wash reverse filtration in the example shown in FIG. 7, the pressures on the sides of the permeate outlets 140 and the raw water inlet 130 may alternatively be so set that the wash water 21 is taken out from the raw water inlet 130 through the pipe 56. In this case, the valve 60c of the pipe 57 as well as the raw water outlet 131 are closed. Further alternatively, the pressures on the sides of the permeate outlets 140 and the raw water outlet 131 may be so set that the wash water 21 is taken out from the raw water outlet 130 through the pipe 57. In this case, the valve 60b of the pipe 56 as well as the raw water inlet 130 are closed.

After performing back wash reverse filtration in the aforementioned manner, the valves 60b, 60g, 60h, 62a and 62b of the pipes 56, 59a, 59b, 61a and 61b are closed and the valve 60a of the pipe 55 is opened. Thus, the raw water 31 taken from the raw water tank 500 is fed into the pressure vessel 110 from the raw water inlet 130 through the pipe 55. In each spiral wound membrane element 1, the raw water 31 is introduced from the first end thereof to axially flow through the spiral wound membrane element 1 along the raw water spacer 6 and thereafter discharged from the second end. Thus, contaminants separated from the separation membranes 2 are carried from the first end toward the second end of the spiral wound membrane element 1 by the raw water 31, and discharged from the second end of the spiral wound membrane element 1 along with the wash water 21 remaining in the spiral wound membrane element 1. Further, the contaminants and the wash water 21 are taken out from the pressure vessel 110 from the raw water outlet 131 through the pipe 57 along with the raw water 31.

Thus, the contaminants separated from the separation membranes 2 of each spiral wound membrane element 1 can be quickly discharged from the system by feeding the raw water 31 in the same direction as that in filtration after back wash reverse filtration. Therefore, the contaminants separated from the separation membranes 2 can be inhibited from adhering to the separation membranes 2 again.

While back wash reverse filtration is performed after air injection in this example, the former may be performed before the latter. Further alternatively, back wash reverse filtration may be performed in parallel with air injection. For example, the valves 60g, 60h, 62a and 62b of the pipes 59a, 59b, 61a and 61b may be simultaneously opened for feeding the air 41 and the wash water 21 from the permeate side. In this case, an effect similar to that attained by performing back wash reverse filtration after air injection as described above can be attained.

While the raw water 31 is axially fed after back wash reverse filtration in this example, the raw water 31 may alternatively be axially fed in parallel with back wash reverse filtration. For example, the valves 60a, 60b, 60c, 60g and 60h of the pipes 55, 56, 57, 59a and 59b may be simultaneously opened in washing for feeding the wash water 21 from the permeate side while feeding the raw water 31 from the raw water side. In this case, an effect similar to that attained when feeding the raw water 31 after back wash reverse filtration as described above can be attained.

While the raw water 31 is fed from the raw water inlet 130 and taken out from the raw water outlet 131 in this example, raw water may alternatively be fed from the raw water outlet 131 and taken out from the raw water inlet 130, to be fed through the spiral wound membrane elements 1 in a direction opposite to that in filtration. In this case, an effect similar to that attained when feeding the raw water 31 in the same direction as that in filtration can be attained. Further alternatively, raw water may be successively fed in the same direction as and in the opposite direction to that in filtration. In this case, contaminants distributed along the overall spiral wound membrane elements 1 can be homogeneously removed and discharged.

While the raw water 31 taken out from the raw water outlet 131 is totally discharged from the system as waste water in this example, the raw water 31 may alternatively be partially discharged from the system as waste water and partially recycled as the raw water 7. For example, the valves 60c and 60d of the pipes 57 and 57a may be opened for partially returning the raw water 31 to the raw water tank 500 through the pipe 57a.

According to the aforementioned recovery of the filtration velocity, contaminants deposited on the separation membranes 2 in filtration can be effectively removed.

According to the inventive running method, as hereinabove described, contaminants deposited on the membrane surfaces can be sufficiently removed, whereby stable running can be performed while maintaining a high permeate flux for efficiently obtaining the permeate 8 also in dead end filtration readily causing deposition of contaminants on the membrane surfaces. In this case, dead end filtration is performed and hence no large pump may be employed for feeding the raw water 7 but the scale of the system can be reduced. Thus, the system cost is reduced.

While the spiral wound membrane module 100 shown in FIG. 7 is subjected to dead end filtration as shown in FIG. 2 in the above description, the spiral wound membrane module 100 shown in FIG. 7 may alternatively be subjected to filtration while taking out the partial raw water 7a from the pressure vessel 110 as shown in FIG. 5.

In filtration of the spiral wound membrane module 100 shown in FIG. 7, for example, the valve 60d of the pipe 57a may be regularly or intermittently opened for taking out the partial raw water 7a, included in the raw water 7 fed into the pressure vessel 110, not permeated through the separation membranes 2 of the spiral wound membrane elements 1 from the pressure vessel 110 from the raw water outlet 131 through the pipe 57a and returning the same to the raw water tank 500. Thus, retention of any liquid can be suppressed in the clearance between the outer peripheral portion of each spiral wound membrane element 1 and the inner peripheral surface of the pressure vessel 110. Further, an axial flow of raw water from the first end toward the second end of each spiral wound membrane element 1 is so formed that partial contaminants can be discharged from the pressure water 110 along with the raw water 7a while suppressing sedimentation of contaminants contained in the raw water 7.

According to the running method performing filtration while taking out partial raw water, more stable running can be performed without reducing the permeate flux over a long period. In this case, the taken out raw water 7a is circulated through the pipe 57a, whereby the permeate 8 can be obtained with high recovery. Further, no large pump may be employed for feeding the raw water 7 but the scale of the system can be reduced. Thus, the system cost is reduced.

Figure 8:
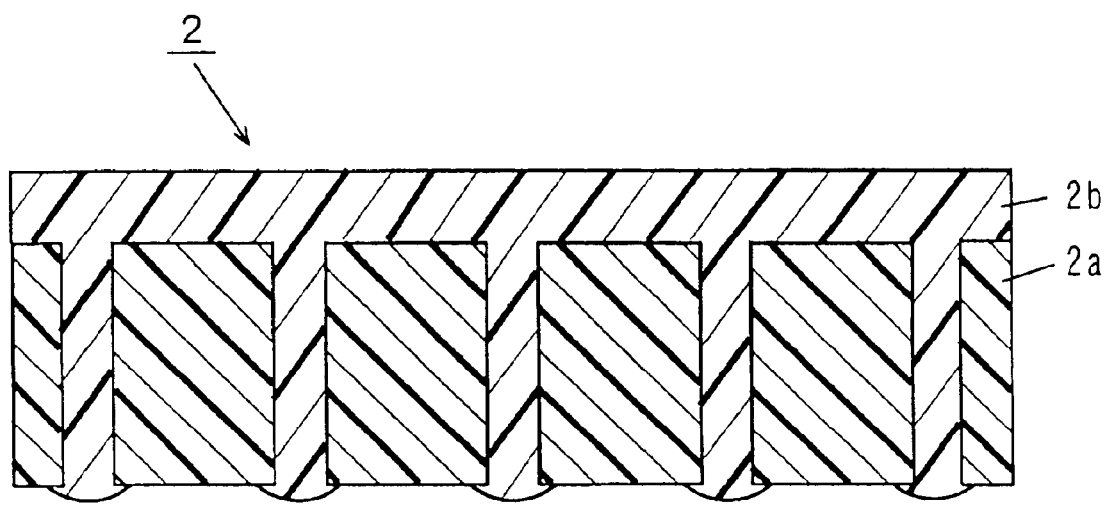
FIG. 8 is a sectional view of a separation membrane employed in the spiral wound membrane element shown in FIG. 6.

FIG. 8 is a sectional view of each separation membrane 2 employed in the spiral wound membrane element 1 shown in FIG. 6. The separation membrane 2 is formed by closely integrating a permeable membrane body 2b having a substantial separation function with the surface of a porous reinforcing sheet (porous sheet member) 2a.

The permeable membrane body 2b is made of a single type of polysulfone resin, a mixture of at least two types of polysulfone resin or a copolymer or a mixture of polysulfone resin and a polymer such as polyimide, fluorine-containing polyimide resin or the like. The porous reinforcing sheet 2a is made of woven fabric, nonwoven fabric, a mesh net or a foaming sintered sheet prepared from polyester, polypropylene, polyethylene or polyamide, and the nonwoven fabric is preferable in consideration of the membrane forming property and the cost.

The porous reinforcing sheet 2a and the permeable membrane body 2b are bonded to each other in such an anchored state that the resin component forming the permeable membrane body 2b is partially charged in pores of the porous reinforcing sheet 2a.

Back pressure strength of the separation membrane 2 lined with the porous reinforcing sheet 2a is improved to 0.4 to 0.5 MPa beyond 0.2 MPa. A method of defining the back pressure strength is described later.

In order to attain back pressure strength of at least 0.2 MPa by employing nonwoven fabric as the material for the porous reinforcing sheet 2a, the nonwoven fabric is preferably 0.08 to 0.15 mm in thickness and 0.5 to 0.8 g/cm³ in density. If the thickness of the nonwoven fabric is smaller than 0.08 mm or the density thereof is smaller than 0.5 g/cm³, sufficient strength for serving as the reinforcing sheet 2a cannot be attained but it is difficult to ensure back pressure strength of at least 0.2 MPa for the separation membrane 2. If the thickness of the nonwoven fabric is larger than 0.15 mm or the density thereof is larger than 0.8 g/cm³, on the other hand, filtration resistance of the porous reinforcing sheet 2a may be increased or the anchoring effect to the nonwoven fabric (porous reinforcing sheet 2a) is reduced to readily cause separation between the permeable membrane body 2b and the nonwoven fabric.

A method of preparing the aforementioned separation membrane 2 is now described. First, a solvent, a non-solvent and a swelling agent are added to polysulfone, and the mixture is heated/dissolved for preparing a homogeneous membrane forming solution. The polysulfone resin is not particularly restricted so far as the same has at least one (—$SO_2$—) site in its molecular structure, as shown in the following structural formula (1):

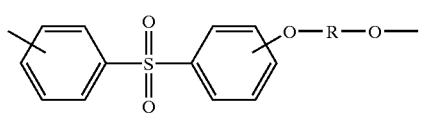
(1)

where R represents a bivalent aromatic, alicyclic or aliphatic hydrocarbon radical or a bivalent organic radical formed by bonding such hydrocarbon radicals with a bivalent organic bonding radical.

Preferably, polysulfone expressed in any of the following structural formulas (2) to (4) is employed:

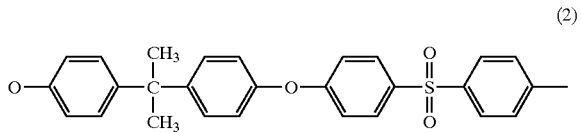
(2)

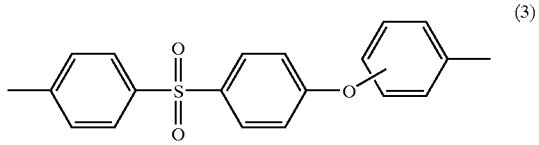
(3)

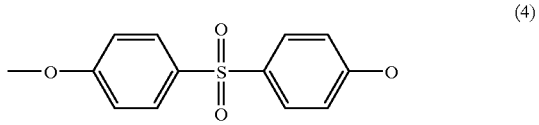
(4)

As the solvent for polysulfone, N-methyl-2-pyrolidone, dimethylformamide, dimethylacetamide, dimethylsulfoxide or the like is preferably employed. As the non-solvent, aliphatic polyhydric alcohol such as ethylene glycol, diethylene glycol, propylene glycol, polyethylene glycol or glycerin, lower aliphatic alcohol such as methanol, ethanol or isopropyl alcohol or lower aliphatic ketone such as methyl ethyl ketone is preferably employed.

The content of the non-solvent in the mixture of the solvent and the non-solvent, not particularly restricted so far as the obtained mixture is homogeneous, is generally 5 to 50 percent by weight, and preferably 20 to 45 percent by weight.

As the swelling agent employed for prompting or controlling formation of a porous structure, metal salt such as lithium chloride, sodium chloride or lithium nitrate, a water-soluble polymer such as polyethylene glycol, polyvinyl alcohol, polyvinyl pyrolidone or polyacrylic acid or metal salt thereof, formamide or the like is employed. The content of the swelling agent in the mixture, not particularly restricted so far as the membrane forming solution is homogeneous, is generally 1 to 50 percent by weight.

The concentration of polysulfone in the membrane forming solution is preferably 10 to 30 percent by weight in general. Permeability of the obtained porous separation membrane is inferior in practicalness if the concentration exceeds 30 percent by weight, while mechanical strength of the obtained porous separation membrane is so inferior that sufficient back pressure strength cannot be attained if the concentration is smaller than 10 percent by weight.

A film of the aforementioned membrane forming solution is formed on a nonwoven fabric support. In other words, a support sheet of nonwoven fabric or the like is successively taken out from a continuous membrane forming apparatus for applying the membrane forming solution onto its surface. The membrane forming solution is applied onto the nonwoven fabric support with a gap coater such as a knife coater or a roll coater. When the roll coater is employed, for example, the membrane forming solution is stored between two rolls to be applied onto the nonwoven fabric support and sufficiently impregnated into the nonwoven fabric at the same time and thereafter passed through a low humidity atmosphere for absorbing a small amount of moisture contained in the atmosphere in the surface of the liquid film applied onto the nonwoven fabric and causing microphase separation on the surface layer of the liquid film. Thereafter the liquid film is dipped in a solidification water tank to be entirely phase-separated and solidified, and the solvent is removed by washing in a washing tank. Thus, the separation membrane 2 is formed.

The aforementioned separation membrane 2 having high back pressure strength is prevented from breakage also when employed for the spiral wound membrane element 1 shown in FIG. 6 and subjected to back wash reverse filtration with a back pressure of 0.05 to 0.3 MPa.

EXAMPLE

In each of Inventive Example and comparative example described below, a spiral wound ultrafiltration membrane element including ultrafiltration membranes having the structure shown in FIG. 8 as the separation membranes 2 was prepared for performing a continuous water filtration test on the spiral wound membrane module 100 shown in FIG. 2 comprising this spiral wound ultrafiltration membrane element.

Each ultrafiltration membrane employed for the spiral wound ultrafiltration membrane elements of Inventive Example and comparative example was prepared as follows:

16.5 parts by weight of polysulfone (P-3500 by BP Amoco), 50 parts by weight of N-methyl-2-pyrolidone, 24.5 parts by weight of diethylene glycol and 1 part by weight of formamide were heated and dissolved for obtaining a homogeneous membrane forming solution. The membrane forming solution was impregnated into/applied to the surface of polyester nonwoven fabric of 0.1 mm in thickness and 0.8 g/cm³ in density with a roll coater having a coater gap adjusted to 0.13 mm.

Thereafter the nonwoven fabric was passed through an atmosphere (low humidity atmosphere) having relative humidity of 25% and a temperature of 30° C. for causing microphase separation, thereafter dipped in a solidification water tank of 35° C. to be de-solvented and solidified, and the remaining solvent was thereafter removed by washing in a washing tank for obtaining a separation membrane 2. The microphase separation time (the time for passing through the low humidity atmosphere) for the separation membrane 2 was 4.5 seconds in each of Inventive Example and comparative example.

The ultrafiltration membrane prepared in the aforementioned manner exhibited a permeate flow rate of 1700 L/m²·hr and back pressure strength of 0.3 MPa, while rejection of polyethylene oxide having a mean molecular weight of 1,000,000 was 99%.

The back pressure strength is defined by a pressure observed when a membrane of 47 mm in diameter is set on a back pressure strength holder (perforated diameter: 23 mm), a water pressure is gradually applied from the side of the porous reinforcing sheet 2a and the permeable membrane body 2b is separated from the porous reinforcing sheet 2a or the permeable membrane body 2b and the porous reinforcing sheet 2a are simultaneously broken.

The rejection of polyethylene oxide is obtained from concentrations of a raw liquid and a permeated liquid through the following formula by permeating a polyethylene oxide solution of 500 ppm in concentration with a pressure of 1 kgf/cm²:

Rejection (%)=[1−(concentration of permeated liquid/concentration of raw liquid)]×100

The continuous water filtration test of the treatment system shown in FIG. 1 with the spiral wound membrane module comprising the ultrafiltration membranes prepared in the aforementioned manner is now described.

Inventive Example

In Inventive Example, well water of water quality shown in Table 1 was fed as raw water in filtration of the treatment system shown in FIG. 1, for performing dead end filtration for 20 minutes by the running method shown in FIG. 2.

TABLE 1

| | |
|---|---|
| pH | 6.8 |
| Turbidity (NUT) | 8.0 |
| Total Iron (mg/L) | 0.4 |
| Total Manganese (mg/L) | 0.15 |
| TOC (mg/L) | 5.4 |

After performing dead end filtration in the aforementioned manner, filtration running was stopped and air injection shown in FIG. 3 and back wash reverse filtration as well as flushing shown in FIG. 4 were successively performed as recovery of the filtration velocity. In air injection, the pressure of the air 41 was set to 0.2 MPa. In back wash reverse filtration, permeate was employed as the wash water 21, which was fed by 3000 L/min. with a back pressure of 0.1 MPa. The time for back wash reverse filtration was set to 15 seconds. After back wash reverse filtration, raw water was fed to the spiral wound membrane module for performing flushing. The flushing time was set to 40 seconds.

The aforementioned filtration and recovery of the filtration velocity were repeated for running the treatment system shown in FIG. 1 continuously for 1000 hours. Table 2 shows the running conditions.

TABLE 2

| | |
|---|---|
| Type of Membrane | Ultrafiltration Membrane |
| Molecular Cutoff | 500,000 |
| Filtration System | Dead End Filtration |
| Running Method | Constant Flow Running |
| Filtration Time | 20 minuites |
| Air Pressure | 0.2 MPa |
| Back Wash Reverse Filtration Time | 15 seconds |
| Flushing Time | 40 seconds |
| Recovery (%) | 90% |

Comparative Example

In comparative example, well water of the water quality shown in Table 1 was fed as raw water in filtration of the treatment system shown in FIG. 1, for performing dead end filtration for 20 minutes by the running method shown in FIG. 2.

After performing dead end filtration in the aforementioned manner, filtration running was stopped and back wash reverse filtration as well as flushing shown in FIG. 3 were successively performed as recovery of the filtration velocity, without performing air injection dissimilarly to Inventive Example. The running conditions shown in Table 2 were employed except air injection.

The aforementioned filtration and recovery of the filtration velocity were repeated for running the treatment system shown in FIG. 1 continuously for 1000 hours.

Figure 9:
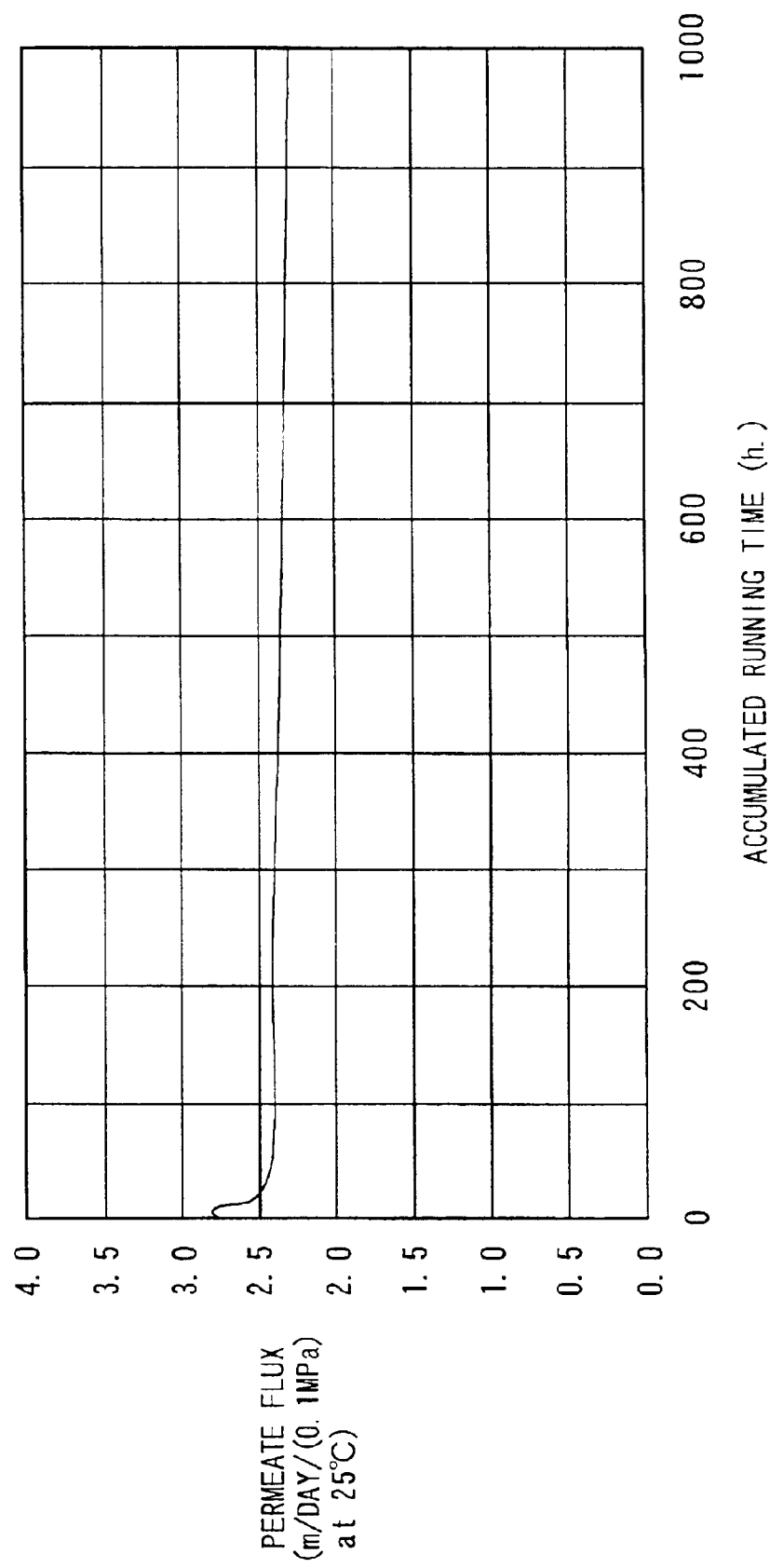
FIG. 9 illustrates change of a permeate flux in Inventive Example.
Figure 10:
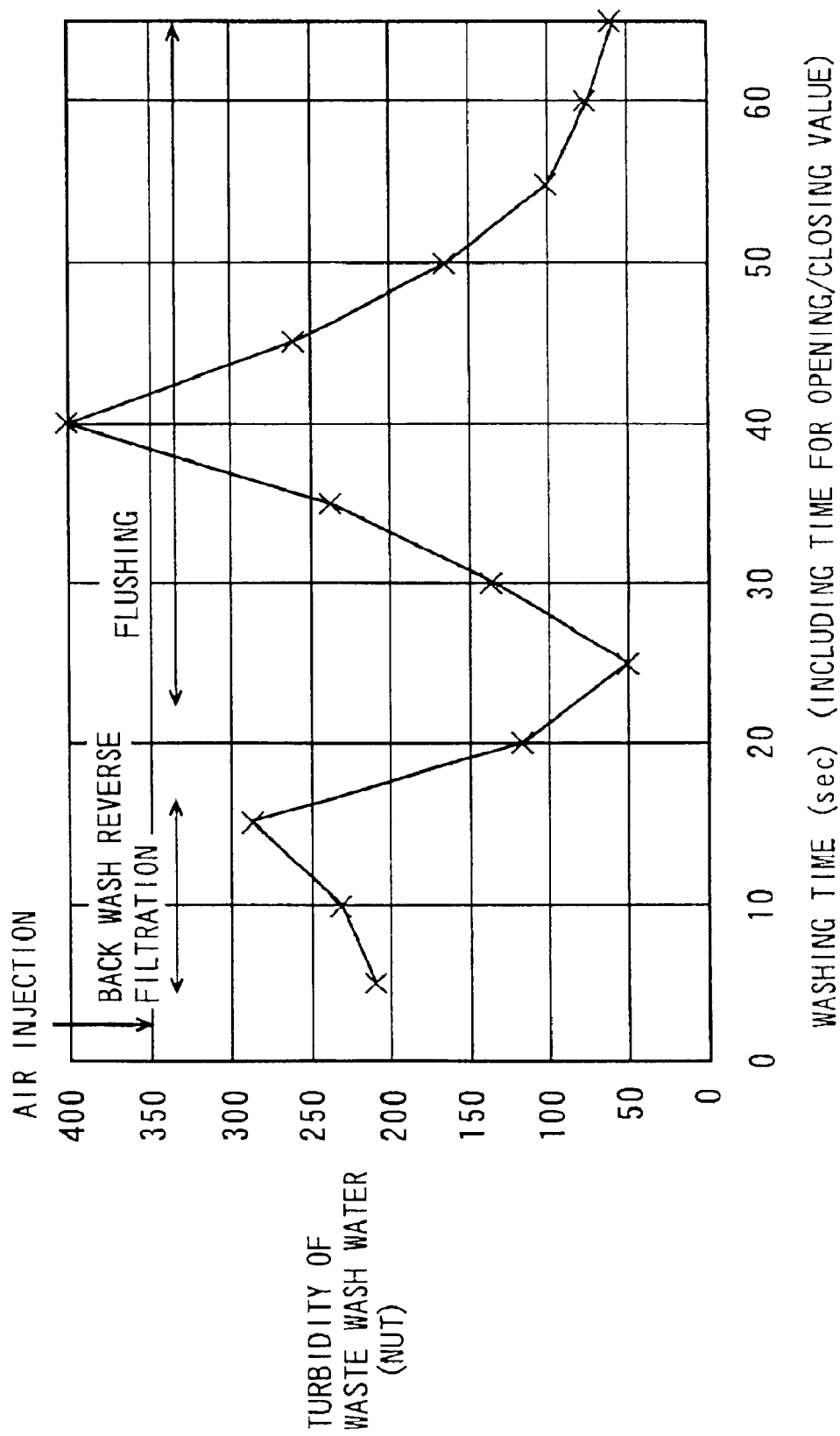
FIG. 10 illustrates turbidity change of waste water in recovery of a filtration velocity in Inventive Example.
Figure 11:
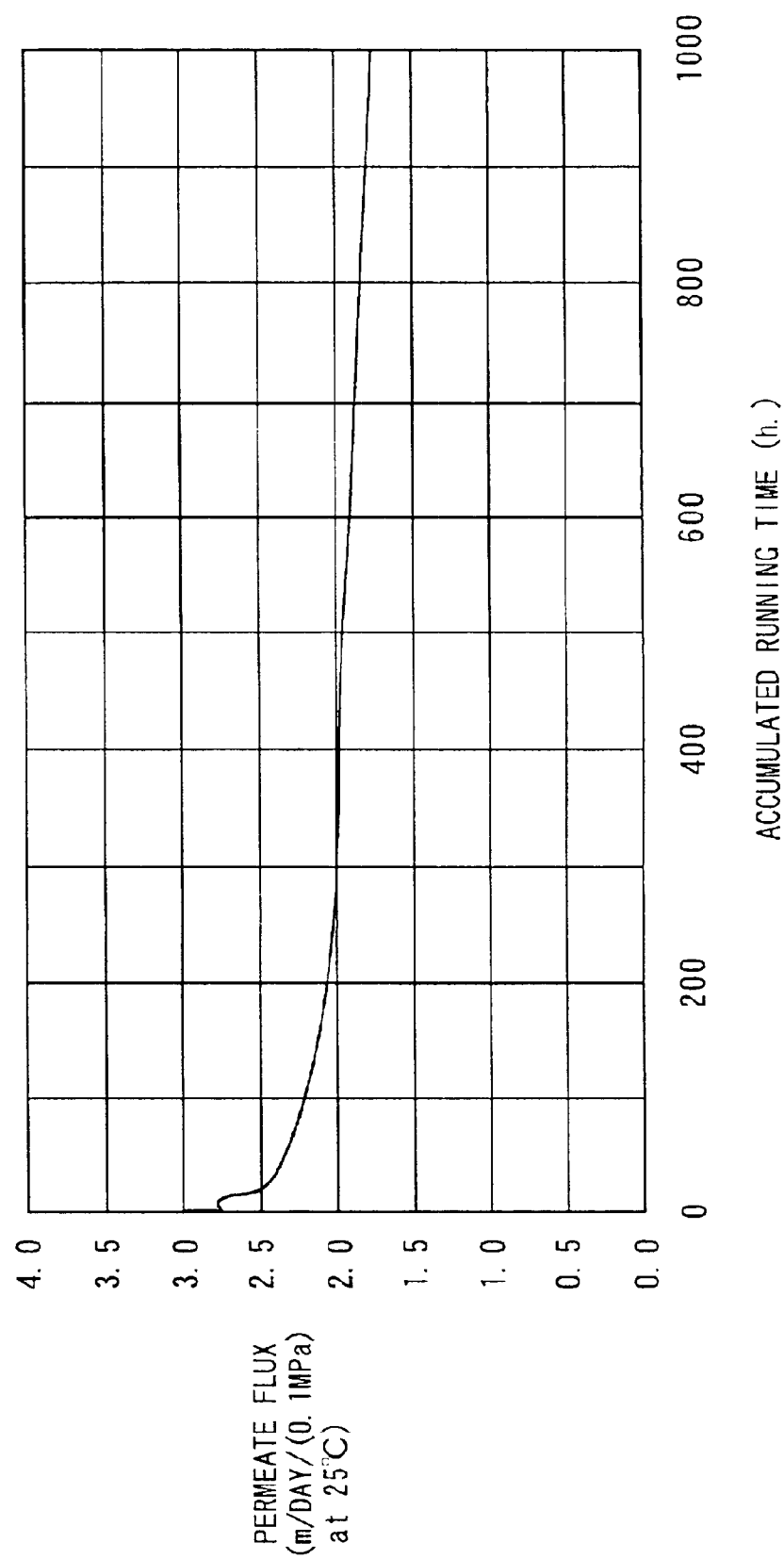
FIG. 11 illustrates change of a permeate flux in comparative example.
Figure 12:
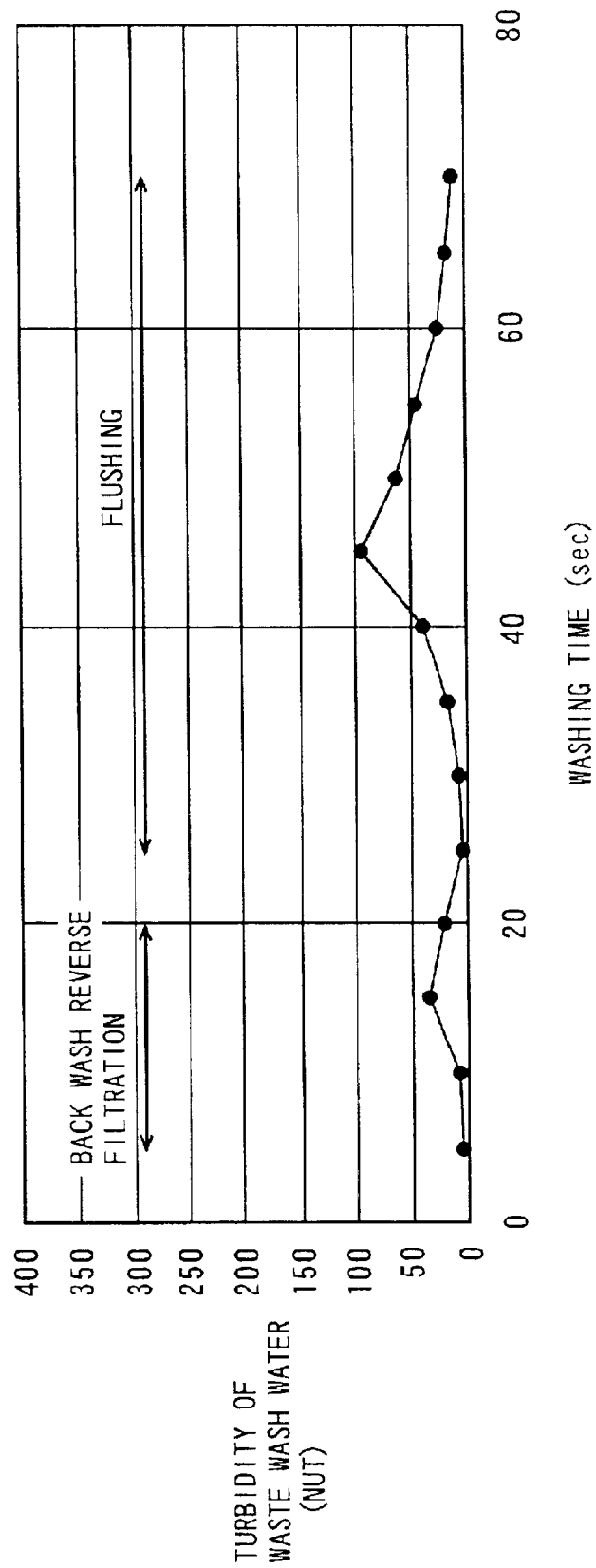
FIG. 12 illustrates turbidity change of waste water in recovery of a filtration velocity in comparative example.

FIG. 9 shows change of the permeate flux in Inventive Example, and FIG. 10 shows change of turbidity of waste water in recovery of the filtration velocity in Inventive Example. FIG. 11 shows change of the permeate flux in comparative example, and FIG. 12 shows change of turbidity of waste water in recovery of the filtration velocity in comparative example.

In Inventive Example, stable running for 1000 hours was possible with recovery of 90%, and the permeate flux was hardly reduced. In comparative example, on the other hand, it was impossible to perform stable running as compared with Inventive Example despite running for 1000 hours with recovery of 90%, and the permeate flux was reduced as compared with Inventive Example after a lapse of 1000 hours.

In Inventive Example, turbidity of waste wash water reached about 210 NTU after air injection, about 280 NTU after back wash reverse filtration and about 400 NTU at the maximum in flushing, as shown in FIG. 10. In comparative example, on the other hand, turbidity of waste wash water was low as a whole and reached about 90 NTU at the maximum, as shown in FIG. 12. Thus, it is understood that turbid components deposited on the membrane surfaces of the separation membranes were effectively discharged during filtration in Inventive Example while those in comparative example were not sufficiently discharged during filtration. This is because air injection, back wash reverse filtration and flushing were performed in Inventive Example while no air injection was performed in comparative example.

As understood from the aforementioned Inventive Example and comparative example, contaminants deposited on the membrane surfaces of the separation membranes can be floated for improving wash dischargeability by performing air injection before back wash reverse filtration and flushing as recovery of the filtration velocity. Consequently, a high permeate flux can be maintained in continuous running.

Figure 13:
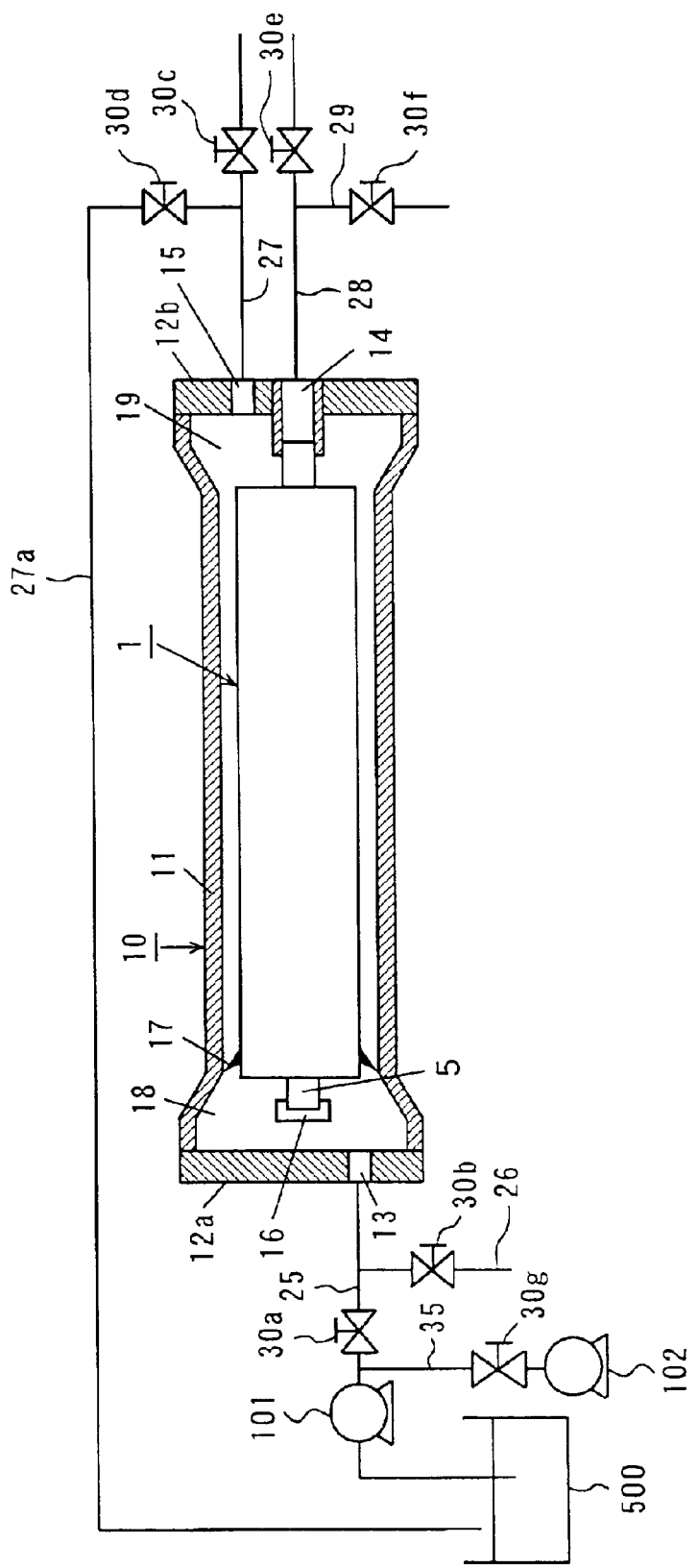
FIG. 13 is a schematic sectional view showing an exemplary spiral wound membrane module according to the present invention.

FIG. 13 is a schematic sectional view showing an exemplary spiral wound membrane module according to another embodiment of the present invention.

As shown in FIG. 13, the spiral wound membrane module is formed by storing a spiral wound membrane element 1 in a pressure vessel (pressure-resistant vessel) 10. The pressure vessel 10 is formed by a tubular case 11 and a pair of end plates 12a and 12b. A raw water inlet 13 is formed on the first end plate 12a, and a raw water outlet 15 is formed on the second end plate 12b. A permeate outlet 14 is provided on the central portion of the second end plate 12b. The structure of the pressure vessel 10 is not restricted to that shown in FIG. 13, but a pressure vessel of a side entry shape having a tubular case provided with a raw water inlet and a raw water outlet may be employed as described later.

The spiral wound membrane element 1 having a packing 17 mounted on a portion close to a first end of its outer peripheral surface is charged in the tubular case 11, and both opening ends of the tubular case 11 are sealed with the end plates 12a and 12b respectively. A first opening end of a water collection pipe 5 is engaged with the permeate outlet 14 of the end plate 12b, and an end cap 16 is mounted on a second opening end thereof. The packing 17 separates the internal space of the pressure vessel 10 into a first liquid chamber 18 and a second liquid chamber 19.

The raw water inlet 13 of the spiral wound membrane module is connected to a pressure pump 101 through a pipe 25, and further connected to a raw water tank 500. A valve 30a is inserted in the pipe 25, and a pipe 26 having a valve 30b inserted therein is connected downstream the valve 30a. An air diffuser 102 is connected upstream the valve 30a through a pipe 35. A valve 30g is inserted in the pipe 35. In this case, an air feeder such as a compressor is employed as the air diffuser 102.

A pipe 27 having a valve 30c inserted therein is connected to the raw water outlet 15, and a pipe 27a having a valve 30d inserted therein is connected upstream the valve 30c of the pipe 27. The raw water outlet 15 is connected to the raw water tank 500 through the pipe 27a. A pipe 28 having a valve 30e inserted therein is connected to the permeate outlet 14, and a pipe 29 having a valve 30f inserted therein is connected upstream the valve 30e.

The structure of the spiral wound membrane element 1 employed for the spiral wound membrane module shown in FIG. 13 is similar to that shown in FIG. 6.

Figure 14:
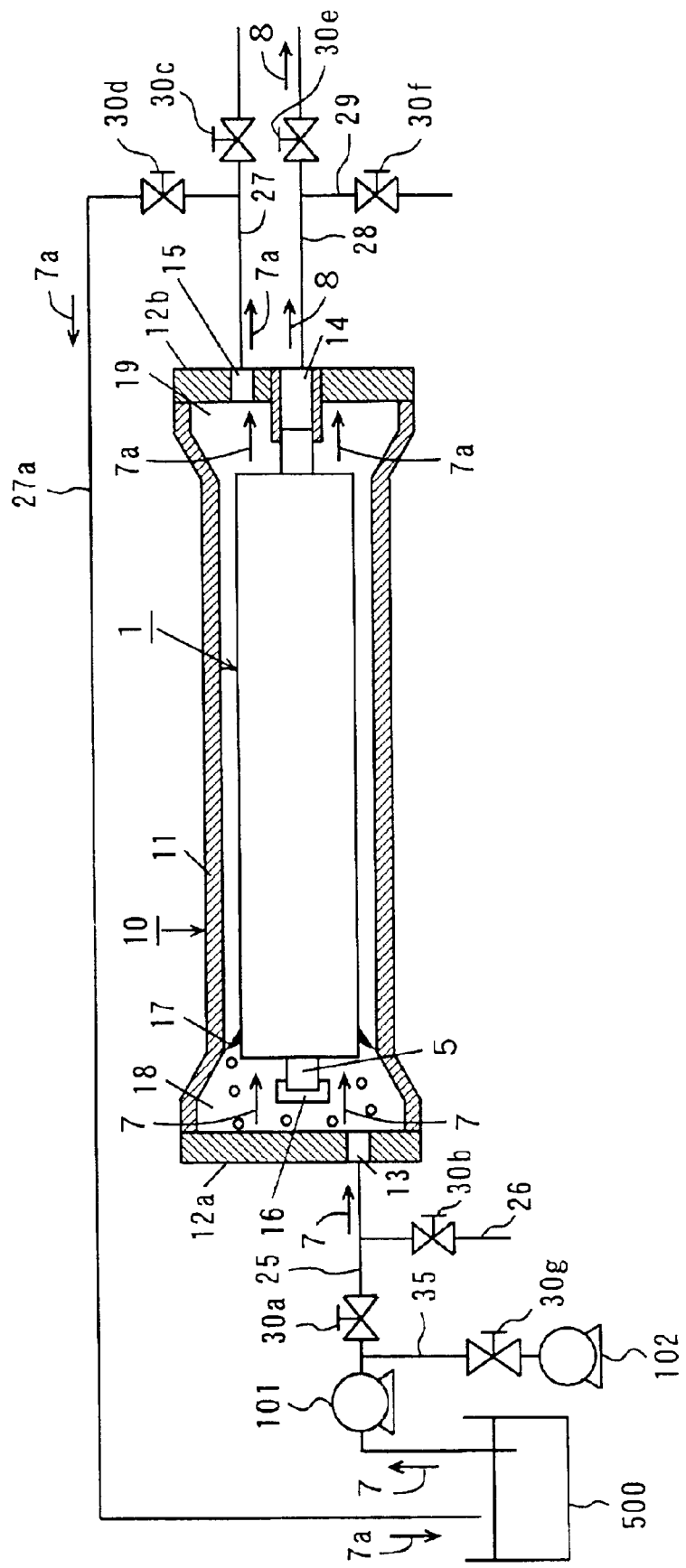
FIGS. 14 and 15 are schematic sectional views showing an exemplary method of running a spiral wound membrane module according to the present invention.
Figure 15:
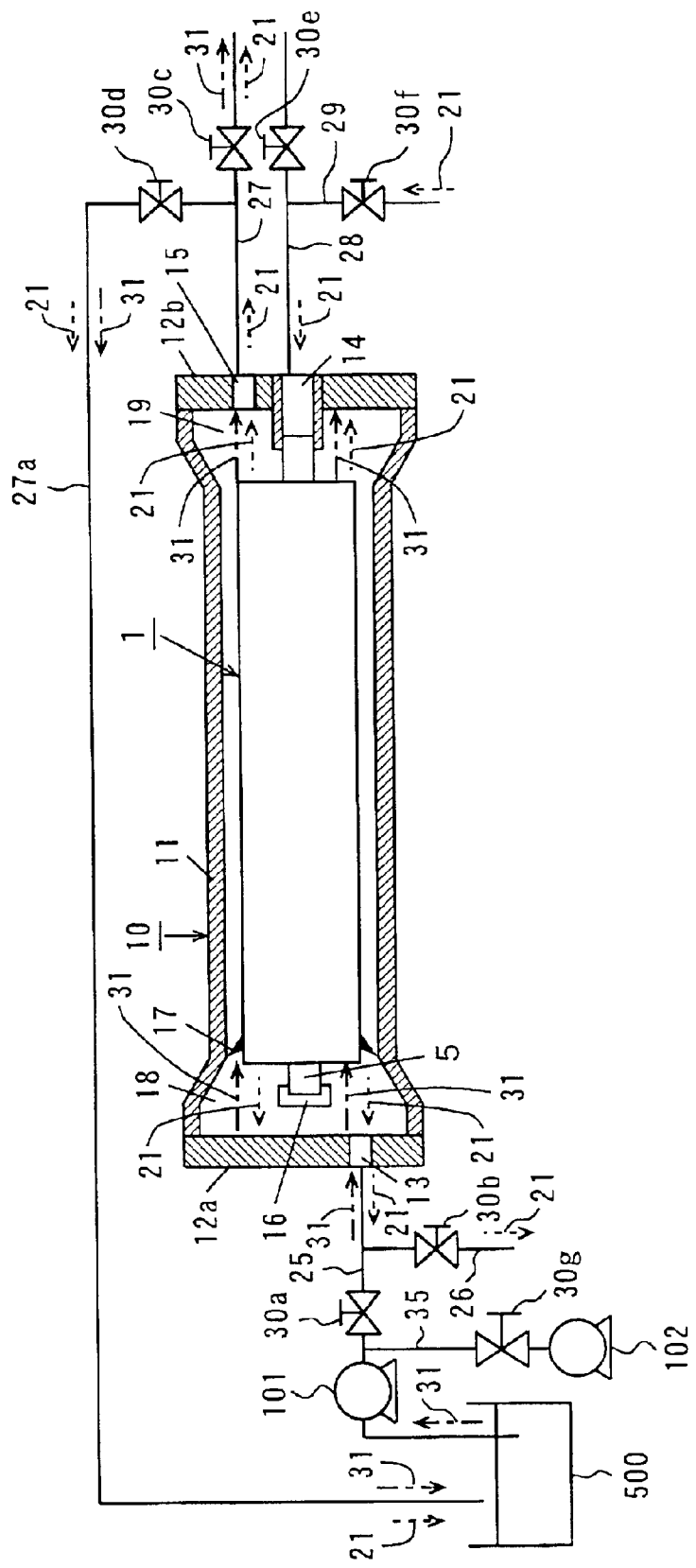

FIGS. 14 and 15 are schematic sectional views showing an exemplary method of running a spiral wound membrane module according to the present invention. This running method is applied to the spiral wound membrane module shown in FIG. 13, and FIG. 14 shows a running method in filtration, while FIG. 15 shows that in washing.

As shown in FIG. 14, the valves 30a, 30d and 30e of the pipes 25, 27a and 28 are opened and the valves 30b, 30c and 30f of the pipes 26, 27 and 29 are closed in filtration.

Raw water 7 taken from the raw water tank 500 is pressurized by the pressure pump 101, and thereafter fed into the pressure vessel 10 from the raw water inlet 13 through the pipe 25. In the spiral wound membrane module, the fed raw water 7 is introduced into the first liquid chamber 18 of the pressure vessel 10 from the raw water inlet 13, and further fed into the spiral wound membrane element 1 from the first end thereof.

The valve 30g of the pipe 35 is opened for introducing bubbles (air) diffused by the air diffuser 102 into the pressure vessel 10. Thus, air bubbling is performed in the spiral wound membrane module.

As shown in FIG. 6, the raw water 7 fed from the first end surface of the spiral wound membrane element 1 linearly flows toward the second end surface in a direction (axial direction) parallel to the water collection pipe 5 along a raw water spacer 6. In the process of the flow of the raw water 7 along the raw water spacer 6, part of the raw water 7 is permeated through the separation membranes 2 due to the pressure difference between the raw water side and the permeate side. This permeate 8 flows into the water collection pipe 5 along a permeate spacer 3, and is discharged from an end of the water collection pipe 5. The remaining raw water 7a not permeated through the separation membranes 2 is discharged from the second end surface of the spiral wound membrane element 1.

As shown in FIG. 14, the permeate 8 discharged from the end of the water collection pipe 5 is taken out from the pressure vessel 10 from the permeate outlet 14 through the pipe 28. The raw water 7a discharged from the second end surface of the spiral wound membrane element 1 is guided into the second liquid chamber 19 and thereafter taken out from the raw water outlet 15 through the pipe 27a, to be returned to the raw water tank 500.

In this example, air bubbling is performed in the spiral wound membrane module while the partial raw water 7a is axially fed through the spiral wound membrane element 1, whereby a flow of diffused air (mixed air-liquid flow) is formed on the membrane surface of the spiral wound membrane element 1. Thus, contaminants can be inhibited from sedimenting on and adhering to the membrane surface of the spiral wound membrane element 1, and contaminants adhering to the membrane surface of the spiral wound membrane element 1 can be separated. Further, partial contaminants contained in the raw water 7 and the contaminants separated from the membrane surface of the spiral wound membrane element 1 can be readily and reliably discharged from the spiral wound membrane element 1 by axially forming the flow of raw water. Thus, stable running can be performed continuously over a long period.

In this example, filtration is performed in the spiral wound membrane module while taking out the partial raw water 7a from the raw water outlet 15. Thus, retention of any liquid can be suppressed in the clearance between the outer peripheral surface of the spiral wound membrane element 1 and the inner peripheral surface of the pressure vessel 10.

The partial raw water 7a discharged from the raw water outlet 15 is so circulated that the permeate 8 can be obtained from the fed raw water 7 with recovery of 100% in theory.

The valve 30g of the pipe 35 may be continuously or intermittently opened. Thus, air bubbling can be continuously or intermittently performed in the spiral wound membrane module.

When intermittently performing air bubbling, opening/closing of the valve 30g may be controlled with a timer. Alternatively, a measuring instrument such as an operating pressure gauge, a transmembrane pressure difference gauge or a permeate flow meter may be set in a membrane separation apparatus having the spiral wound membrane module assembled therein for controlling opening/closing of the valve 30g according to a signal received from the measuring instrument.

For example, the permeate flow rate of the spiral wound membrane element 1 is reduced following adhesion of contaminants to the membrane surface etc. of the spiral wound membrane element 1, and hence change of the permeate flow rate is measured with a permeate flow meter for transmitting a signal and opening the valve 30g when the permeate flow rate is changed. Thus, contaminants adhering to the membrane surface etc. of the spiral wound membrane element 1 can be separated for maintaining a stable permeate flow rate.

The valve 30d may be opened/closed following opening/closing of the valve 30g, for intermittently forming a flow of raw water in response to air bubbling.

While the valve 30d is regularly opened for taking out the raw water 7a in the above description, the valve 30d may alternatively be intermittently opened for taking out the raw water 7a. Also in this case, contaminants can be inhibited from adhering to the separation membranes 2 similarly to the case of regularly taking out the raw water 7a.

While the raw water 7a taken out from the pressure vessel 10 is totally returned to the raw water tank 500 in the above description, the taken out raw water 7a may alternatively be partially discharged from the system. For example, the valve 30d as well as the valve 30c may be opened for partially discharging the raw water 7a from the system through the pipe 27. Further alternatively, the taken out raw water 7a may be totally discharged from the system.

After filtration is performed for a constant time, washing is performed as follows: As shown in FIG. 15, the valves 30a, 30e, 30d and 30g of the pipes 25, 28, 27a and 35 are closed and the valves 30b, 30f and 30c of the pipes 26, 29 and 27 are opened for performing back wash reverse filtration in washing.

In back wash reverse filtration, wash water 21 is fed to the opening end of the water collection pipe 5 from the permeate outlet 14 through the pipes 29 and 28, and introduced into the water collection pipe 5. The wash water 21 is prepared from the permeate 8, for example. The wash water 21 introduced into the water collection pipe 5 is guided into the separation membranes 2 from the outer peripheral surface of the water collection pipe 5, and permeated through the separation membranes 2 in a direction opposite to that in filtration. At this time, contaminants deposited on the membrane surfaces of the separation membranes 2 are separated from the separation membranes 2. The outer peripheral surface of the spiral wound membrane element 1 is covered with a sheath member, and hence the wash water 21 permeated through the separation membranes 2 axially flows through the spiral wound membrane element 1 along the raw water spacer 6, and is discharged into the first liquid chamber 18 and the second liquid chamber 19 from both ends of the spiral wound membrane element 1. Further, the wash water 21 is taken out from the raw water inlet 13 and the raw water outlet 15 through the pipes 26 and 27 respectively.

In this case, pressures on the sides of the permeate outlet 14, the raw water inlet 13 and the raw water outlet 15 are so set as to apply a back pressure of 0.05 to 0.3 MPa to the separation membranes 2. Thus, a necessary amount of the wash water 21 can be fed in a short time, so that contaminants deposited on the membrane surfaces of the separation membranes 2 can be effectively separated. Further, the separated contaminants can be inhibited from being captured by the raw water spacer 6 before the same are discharged from the end of the spiral wound membrane element 1, to be effectively removed.

While the wash water 21 taken out from the raw water inlet 13 is totally discharged from the system as waste water in this example, the wash water 21 may alternatively be partially discharged from the system as waste water and partially recycled as the raw water 7. For example, a further pipe may be provided downstream the valve 30b of the pipe 26 and connected to the raw water tank 500, for partially returning the wash water 21 to the raw water tank 500.

While the wash water 21 taken out from the raw water outlet 15 is totally discharged from the system as waste water in this example, the wash water 21 may alternatively be partially discharged from the system as wash water and partially recycled as the raw water 7. For example, the valves 30c and 30d of the pipes 27 and 27a may be opened for partially returning the wash water 21 to the raw water tank 500 through the pipe 27a.

While the wash water 21 is discharged from both ends of the spiral wound membrane element 1 and taken out from the raw water inlet 13 and the raw water outlet 15 through the pipes 26 and 27 respectively in back wash reverse filtration in the example shown in FIG. 15, the pressures on the sides of the permeate outlet 14 and the raw water inlet 13 may alternatively be so set that the wash water 21 is discharged into the first liquid chamber 18 from the first end of the spiral wound membrane element 1 and taken out from the raw water inlet 13 through the pipe 26. In this case, the valve 30c of the pipe 27 and the raw water outlet 15 are closed. Further alternatively, the pressures on the sides of the permeate outlet 14 and the raw water outlet 15 may be so set that the wash water 21 is discharged into the second liquid chamber 19 from the second end of the spiral wound membrane element 1 and taken out from the raw water outlet 15 through the pipe 27. In this case, the valve 30b of the pipe 26 and the raw water inlet 13 are closed.

After performing back wash reverse filtration in the aforementioned manner, the valves 30b and 30f of the pipes 26 and 29 are closed and the valve 30a of the pipe 25 is opened. Thus, raw water 31 taken from the raw water tank 500 is fed into the pressure vessel 10 from the raw water inlet 13 through the pipe 25, and introduced into the first liquid chamber 18. The raw water 31 is fed into the spiral wound membrane element 1 from the first end thereof, axially flows through the spiral wound membrane element 1 along the raw water spacer 6 and is thereafter discharged from the second end. Thus, contaminants separated from the separation membranes 2 are carried from the first end toward the second end of the spiral wound membrane element 1 along with the raw water 31, and discharged into the second liquid chamber 19 from the second end of the spiral wound membrane element 1 along with the wash water 21 remaining in the spiral wound membrane element 1. Further, the contaminants are taken out from the pressure vessel 10 from the raw water outlet 15 through the pipe 27 along with the raw water 31.

Thus, the contaminants separated from the separation membranes 2 in the spiral wound membrane element 1 can be quickly discharged from the system in back wash reverse filtration by performing flushing of feeding the raw water 31 in the same direction as that in filtration. Therefore, the contaminants separated from the separation membranes 2 can be prevented from adhering to the separation membranes 2 again.

According to the aforementioned washing method, contaminants adhering to the membrane surface of the spiral wound membrane element 1, the raw water spacer 6 etc., particularly to the separation membranes 2 can be readily and reliably discharged along the axial direction, for suppressing increase of resistance of the separation membranes 2. Thus, a stable permeate flow rate can be regularly maintained.

According to the aforementioned running method in washing, contaminants deposited on the separation membranes 2 in filtration can be so effectively removed that stable running can be performed without reducing the permeate flux over a long period also in dead end filtration readily causing deposition of contaminants on the membrane surfaces.

While flushing of axially feeding the raw water 31 is performed after back wash reverse filtration in this example, the former may alternatively be performed before the latter. According to this washing method, most contaminants captured on the membrane surface of the spiral wound membrane element 1 are removed by flushing, and contaminants remaining on the membrane surface of the spiral wound membrane element 1 can be removed by introducing the wash water 21. Also in this case, therefore, an effect similar to that of the aforementioned back wash reverse filtration can be attained.

Further alternatively, flushing of axially feeding the raw water 31 may be performed in parallel with back wash reverse filtration. For example, the valves 30a, 30b, 30c and 30f of the pipes 25, 26, 27 and 29 may be simultaneously opened in washing for feeding the wash water 21 from the permeate side while feeding the raw water 31 from the raw water side. In this case, an effect similar to that attained when feeding the raw water 31 after back wash reverse filtration as described above can be attained.

While the raw water 31 is fed from the raw water inlet 13 and taken out from the raw water outlet 15 in this example, raw water may alternatively be fed from the raw water outlet 15 and taken out from the raw water inlet 13 to be fed through the spiral wound membrane element 1 in a direction opposite to that in filtration. In this case, an effect similar to that attained when feeding the raw water 31 in the same direction as that in filtration as described above can be attained.

When feeding the raw water in the same direction as that in filtration, particularly contaminants deposited on the side closer to the second liquid chamber 19 of the spiral wound membrane element 1 can be readily removed and discharged. When feeding the raw water in the direction opposite to that in filtration, on the other hand, particularly contaminants deposited on the side closer to the first liquid chamber 18 of the spiral wound membrane element 1 can be readily removed and discharged.

Further alternatively, raw water may be successively fed in the same direction as and in the opposite direction to that in filtration. In this case, contaminants distributed along the overall spiral wound membrane element 1 can be homogeneously removed and discharged.

While the raw water 31 taken out from the raw water outlet 15 is totally discharged from the system as waste water in this example, the raw water 31 may alternatively be partially discharged from the system as waste water and partially recycled as the raw water 7. For example, the valves 30c and 30d of the pipes 27 and 27a may be opened for partially returning the raw water 31 to the raw water tank 500 through the pipe 27a.

According to this running method, as hereinabove described, contaminants deposited on the membrane surface can be so sufficiently removed that stable running can be performed without reducing the permeate flux over a long period.

In particular, contaminants contained in the raw water 7 can be inhibited from sedimenting on the membrane surface while partial contaminants can be discharged from the pressure vessel 10 along with the raw water 7a by taking out the partial raw water 7a from the pressure vessel 10 in filtration as shown in FIG. 14, whereby more stable filtration running can be performed. In this case, the raw water 7a taken out from the raw water outlet 15 is circulated through the pipe 27a, whereby the permeate 8 can be obtained with high recovery. Further, no large pump is required for feeding the raw water 7 but the scale of the system can be reduced. Thus, the system cost is reduced.

While the spiral wound membrane module comprising the single spiral wound membrane element 1 is run in the above description, the inventive running method is also applicable to a spiral wound membrane module comprising a plurality of spiral wound membrane elements.

Figure 16:
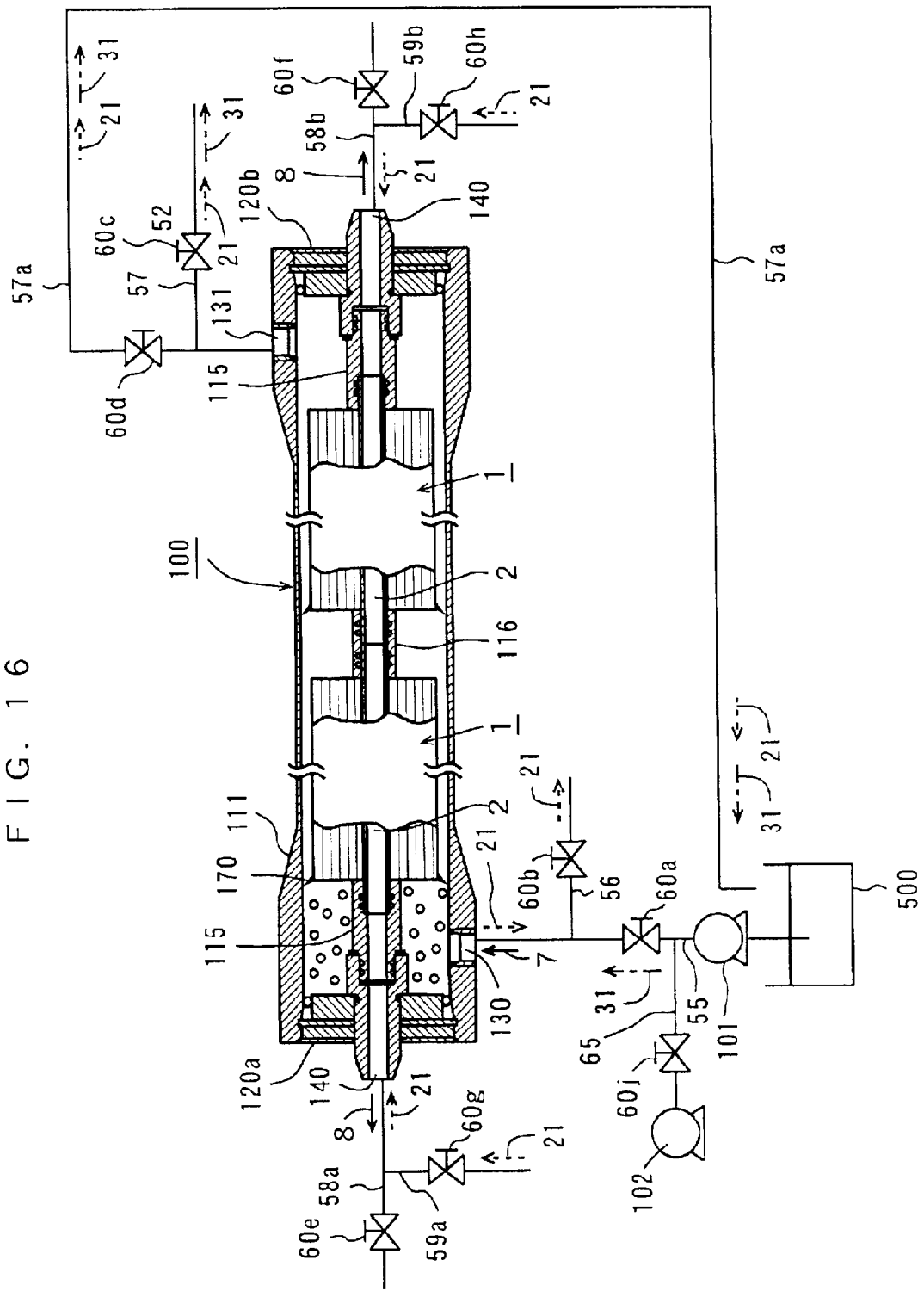
FIG. 16 is a schematic sectional view showing another exemplary method of running a spiral wound membrane module according to the present invention.

FIG. 16 is a schematic sectional view showing still another exemplary method of running a spiral wound membrane module according to the present invention.

As shown in FIG. 16, this spiral wound membrane module is formed by storing a plurality of spiral wound membrane elements 1 in a pressure vessel 100. The pressure vessel 100 is formed by a tubular case 111 and a pair of end plates 120a and 120b. A raw water inlet 130 is formed on the bottom portion of the tubular case 111, and a raw water outlet 131 formed on the upper portion thereof. Thus, the pressure vessel 100 has a side entry shape. The raw water outlet 131 is employed also for deairing. Permeate outlets 140 are provided on the central portions of the end plates 120a and 120b.

The plurality of spiral wound membrane elements 1 having water collection pipes 5 serially connected with each other by an interconnector 116 are stored in the tubular case 111, and both opening ends of the tubular case 111 are sealed with the end plates 120a and 120b respectively. The spiral wound membrane elements 1 are identical to the spiral wound membrane element 1 shown in FIG. 6. Single ends of the water collection pipes 5 of the endmost spiral wound membrane elements 1 are engaged with the permeate outlets 140 of the end plates 120a and 120b through adapters 115 respectively. Packings 170 are mounted on portions close to first ends of the outer peripheral surfaces of the spiral wound membrane elements 1, to separate the internal space of the pressure vessel 100 into a plurality of liquid chambers.

The raw water inlet 130 of the spiral wound membrane module is connected to a pressure pump 101 through a pipe 55, and further connected to a raw water tank 500. A valve 60a is inserted in the pipe 55, and a pipe 56 having a valve 60b inserted therein is connected downstream the valve 60a. An air diffuser 102 is connected upstream the valve 60a through a pipe 65. In this case, the air diffuser 102 is formed by an air feeder such as a compressor. A valve 60j is inserted in the pipe 65.

On the other hand, a pipe 57 having a valve 60c inserted therein is connected to the raw water outlet 131, and a pipe 57a having a valve 60d inserted therein is connected upstream the valve 60c of the pipe 57. The raw water outlet 131 is connected to the raw water tank 500 through the pipe 57a. A pipe 58a having a valve 60e inserted therein is connected to the permeate outlet 140 of the end plate 120a, and a pipe 59a having a valve 60g inserted therein is connected upstream the valve 60e. A pipe 58b having a valve 60f inserted therein is connected to the permeate outlet 140 of the end plate 120b, and a pipe 59b having a valve 60h inserted therein is connected upstream the valve 60f.

In filtration of the spiral wound membrane module, the valves 60a, 60d, 60e and 60f of the pipes 55, 57a, 58a and 58b are opened and the valves 60b, 60g, 60h, 60c and 60j of the pipes 56, 59a, 59b, 57 and 65 are closed.

Raw water 7 taken from the raw water tank 500 is pressurized by the pressure pump 101 and thereafter fed into the pressure vessel 100 from the raw water inlet 130 through the pipe 55. The raw water 7 fed from the raw water inlet 130 into the spiral wound membrane module is introduced into the endmost spiral wound membrane element 1 closer to the end plate 120a from the first end surface thereof.

The valve 60j of the pipe 65 is opened for introducing bubbles (air) diffused by the air diffuser 102 into the pressure vessel 100. Thus, air bubbling is performed in the spiral wound membrane module.

In each spiral wound membrane element 1, partial raw water is permeated through separation membranes 2 to flow into the water collection pipe 5 and is discharged from an end of the water collection pipe 5 as permeate 8, as shown in FIG. 6. The remaining raw water 7a not permeated through the separation membranes 2 is discharged from a second end surface. The discharged raw water 7a is introduced into the subsequent spiral wound membrane element 1 from a first end surface thereof, and separated into permeate 8 and raw water 7a similarly to the above. Thus, membrane separation is performed in each of the plurality of serially connected spiral wound membrane elements 1.

In this example, air bubbling is performed in the spiral wound membrane module while a flow of the raw water 7 is axially formed in each spiral wound membrane element 1, whereby a flow of diffused air is formed on the membrane surface of the spiral wound membrane element 1. Thus, contaminants can be inhibited from sedimenting on and adhering to the membrane surface of the spiral wound membrane element 1, and contaminants adhering to the membrane surface of the spiral wound membrane element 1 can be separated. Further, partial contaminants contained in the raw water 7 and contaminants separated from the membrane surface of each spiral wound membrane element 1 can be readily and reliably discharged from the spiral wound membrane module due to the flow of the raw water 7. Thus, stable running can be performed continuously over a long period.

In this example, filtration is performed in the spiral wound membrane module while taking out the partial raw water 7a from the raw water outlet 15. Thus, retention of any liquid can be suppressed in the clearance between the outer peripheral surface of each spiral wound membrane element 1 and the inner peripheral surface of the pressure vessel 100.

The partial raw water 7a discharged from the raw water outlet 15 is so circulated by a circulation system formed by the pipe 57a that permeate 52 can be obtained from the raw water 7 with recovery of 100% in theory.

In this case, the spiral wound membrane module charged with the plurality of spiral wound membrane elements 1 has a large treatment capacity so that the permeate 52 can be efficiently obtained.

While the raw water 7a taken out from the pressure vessel 100 is totally returned to the raw water tank 500 in the above description, the taken out raw water 7a may alternatively be partially discharged from the system. For example, the valves 60d and 60c may be opened for partially discharging the raw water 7a from the system through the pipe 57. Further alternatively, the taken out raw water 7a may be totally discharged from the system.

After performing filtration for a constant time, washing is performed as follows: In washing, the valves 60a, 60e, 60f, 60d and 60j of the pipes 55, 58a, 58b, 57a and 65 are closed and the valves 60b, 60c, 60g and 60h of the pipes 56, 57, 59a and 59b are opened for performing back wash reverse filtration.

In back wash reverse filtration, wash water 21 is fed to the first ends of the water collection pipes 5 closer to the end plate 120a from the permeate outlet 140 through the pipes 59a and 58a. Further, wash water 21 is fed to the second ends of the water collection pipes 5 closer to the end plate 120b from the permeate outlet 140 through the pipes 59b and 58b. Thus, the wash water 21 is introduced into the water collection pipes 5 from both ends thereof. The wash water 21 introduced into the water collection pipes 5 is guided into the separation membranes 2 from the outer peripheral surfaces of the water collection pipes 5 in the spiral wound membrane elements 1, and permeated through the separation membranes 2 in a direction opposite to that in filtration. At this time, contaminants deposited on the membrane surfaces of the separation membranes 2 are separated from the separation membranes 2. The wash water 21 permeated through the separation membranes 2 axially flows through the spiral wound membrane elements 1 along raw water spacers 6, and is discharged from both ends of the spiral wound membrane elements 1. The discharged wash water 21 is taken out from the raw water inlet 130 and the raw water outlet 131 through the pipes 56 and 57 respectively.

In this case, pressures on the sides of the permeate outlets 140, the raw water inlet 130 and the raw water outlet 131 are so set as to apply a back pressure of 0.05 to 0.3 MPa to the separation membranes 2 of the spiral wound membrane elements 1. Thus, a necessary amount of the wash water 21 can be fed in a short time, for effectively separating contaminants deposited on the membrane surfaces of the separation membranes 2. Further, the separated contaminants can be inhibited from being captured by the raw water spacers 6 before the same are discharged from the ends of the spirally wound membrane elements 1, to be effectively removed.

While the wash water 21 taken out from the raw water inlet 130 is totally discharged from the system as waste water in this example, the wash water 21 may alternatively be partially discharged from the system as wash water and partially recycled as the raw water 7. For example, a further pipe may be provided downstream the valve 60b of the pipe 56 and connected to the raw water tank 500, thereby partially returning the wash water 21 to the raw water tank 500.

While the wash water 21 taken out from the raw water outlet 131 is totally discharged from the system as waste water in this example, the wash water 21 may alternatively be partially discharged from the system as waste water and partially recycled as the raw water 7. For example, the valves 60c and 60d of the pipes 57 and 57a may be opened for partially returning the wash water 21 to the raw water tank 500 through the pipe 57a.

While the wash water 21 is taken out from the raw water inlet 130 and the raw water outlet 131 through the pipes 56 and 57 respectively in back wash reverse filtration in the example shown in FIG. 16, the pressures on the sides of the permeate outlets 140 and the raw water outlet 130 may alternatively be so set that the wash water 21 is taken out from the raw water inlet 130 through the pipe 56. In this case, the valve 60c of the pipe 57 and the raw water outlet 131 are closed. Further alternatively, the pressures on the sides of the permeate outlets 140 and the raw water outlet 131 may be set so that the wash water 21 is taken out from the raw water outlet 131 through the pipe 57. In this case, the valve 60b of the pipe 56 and the raw water inlet 130 are closed.

After performing back wash reverse filtration in the aforementioned manner, the vales 60b, 60g and 60h of the pipes 56, 59a and 59b are closed and the valve 60a of the pipe 55 is opened. Thus, raw water 31 taken from the raw water tank 50 is fed into the pressure vessel 100 from the raw water inlet 130 through the pipe 55. The raw water 31 is introduced into the spiral wound membrane elements 1 from the first ends to axially flow through the spiral wound membrane elements 1 along the raw water spacers 6, and thereafter discharged from the second ends. Thus, contaminants separated from the separation membranes 2 are carried by the raw water 31 from the first ends toward the second ends of the spiral wound membrane elements 1 and discharged from the second ends of the spiral wound membrane elements 1 along with the wash water 21 remaining in the spiral wound membrane elements 1. Further, contaminants and the wash water 21 are taken out from the pressure vessel 100 from the raw water outlet 131 through the pipe 57 along with the raw water 31.

Thus, contaminants separated from the separation membranes 2 in the spiral wound membrane elements 1 can be quickly discharged from the system by performing flushing of feeding the raw water 31 in the same direction as that in filtration after back wash reverse filtration. Thus, the contaminants separated from the separation membranes 2 can be prevented from adhering to the separation membranes 2 again.

According to the aforementioned washing method, contaminants adhering to the membrane surfaces of the spiral wound membrane elements 1, the raw water spacers 6 etc., particularly to the separation membranes 2 can be readily and reliably discharged along the axial direction, for suppressing increase of resistance of the separation membranes 2. Thus, a stable permeate flow rate can be regularly maintained.

In each of the methods of running a spiral wound membrane element and a spiral wound membrane module shown in FIGS. 13 and 16, the partial raw water 7a taken out from the raw water outlet 15 or 131 in running and the raw water employed for flushing in washing is returned to the raw water tank 500 through the pipe 27a or 57a, while the raw water may alternatively be discharged without circulation.

While air bubbling is performed when running the spiral wound membrane element or the spiral wound membrane module in each of the methods of running a spiral wound membrane element and a spiral wound membrane module shown in FIGS. 13 and 16 in the above description, air bubbling may alternatively be performed in an operation other than running.

For example, air bubbling may be performed in back wash reverse filtration. Alternatively, air bubbling may be performed when running is stopped and the spiral wound membrane module is charged with raw water or wash water (permeate). Further alternatively, air bubbling may be performed when running is stopped and the membrane surface is flushed with raw water or wash water (permeate). Also in this case, an effect similar to the above can be attained.

While the flushing of axially feeding the raw water 31 is performed after back wash reverse filtration in this example, the former may alternatively be performed before the latter. According to this washing method, most contaminants captured on the membrane surfaces of the spiral wound membrane elements 1 are removed by flushing, and contaminants remaining on the membrane surfaces of the spiral wound membrane elements 1 can be removed by further introducing the wash water 21. Also in this case, therefore, an effect similar to that of the aforementioned back wash reverse filtration can be attained.

Alternatively, flushing of axially feeding the raw water 31 may be performed in parallel with back wash reverse filtration. For example, the valves 60a, 60b, 60c, 60g and 60h of the pipes 55, 56, 57, 59a and 59b may be simultaneously opened in washing for feeding the wash water 21 from the permeate side while feeding the raw water 31 from the raw water side. In this case, an effect similar to that attained when feeding the raw water 31 after back wash reverse filtration as described above can be attained.

While the raw water 31 is fed from the raw water inlet 130 and taken out from the raw water outlet 131 in this example, raw water may alternatively be fed from the raw water outlet 131 and taken out from the raw water inlet 130 to be fed through the spiral wound membrane elements 1 in a direction opposite to that in filtration. In this case, an effect similar to that attained when feeding the raw water 31 in the same direction as that in filtration as described above can be attained. Further alternatively, raw water may be successively fed in the same direction as and in the opposite direction to that in filtration. In this case, contaminants distributed along the overall spiral wound membrane elements 1 can be homogeneously removed and discharged.

While the raw water 31 taken out from the raw water outlet 131 is totally discharged from the system as waste water in this example, the raw water 31 may alternatively be partially discharged from the system as waste water and partially recycled as the raw water 7. For example, the valves 60c and 60d of the pipes 57 and 57a may be opened for partially returning the raw water 31 to the raw water tank 500 through the pipe 57a.

According to the aforementioned running method in washing, contaminants deposited on the separation membranes 2 in filtration can be effectively removed.

According to the running method of performing filtration while partially taking out raw water, more stable running can be performed without reducing the permeate flux over a long period. In this case, the taken out raw water 7a is circulated through the pipe 57a, whereby permeate 8 can be obtained with high recovery. Further, no large pump is required for feeding the raw water 7 but the scale of the system can be reduced. Thus, the system cost is reduced.

Figure 17:
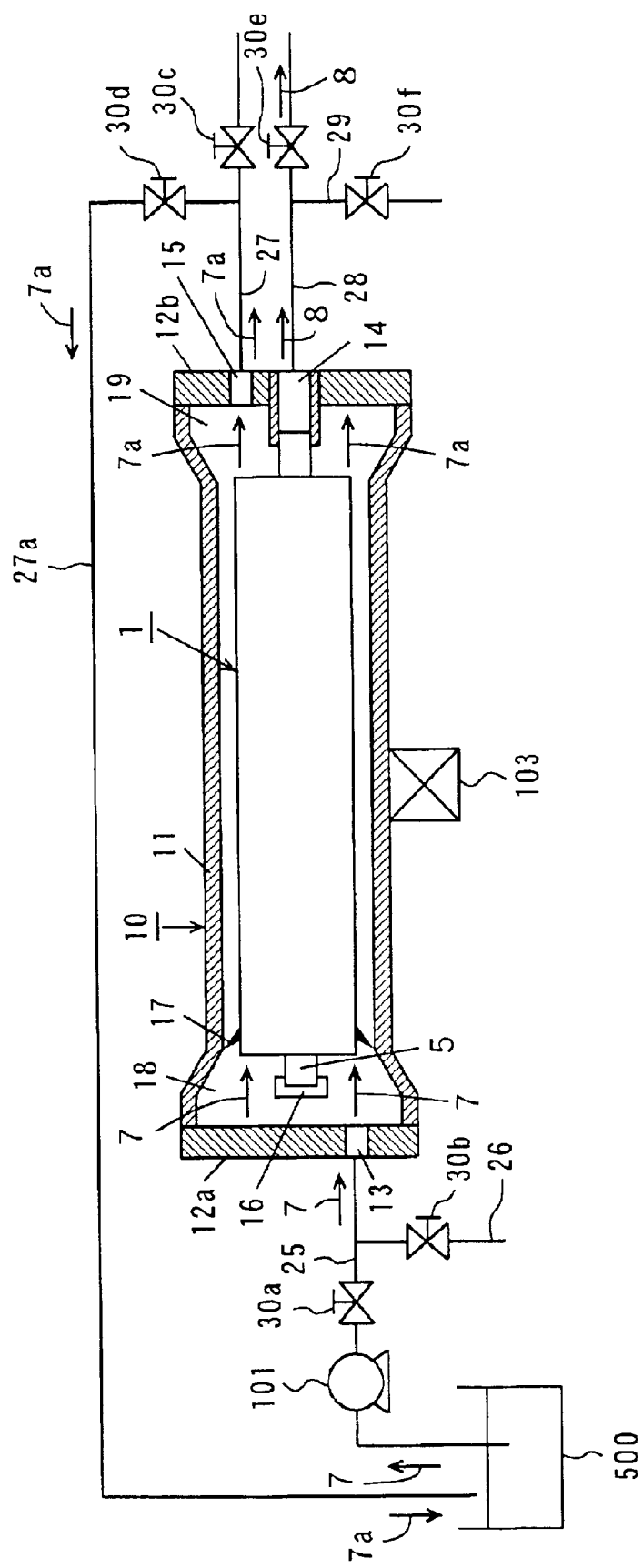
FIG. 17 is a schematic sectional view showing an exemplary spiral wound membrane module according to another embodiment of the present invention.

FIG. 17 is a schematic sectional view showing a further exemplary method of running a spiral wound membrane element and a spiral wound membrane module according to the present invention. The spiral wound membrane module shown in FIG. 17 is similar in structure to the spiral wound membrane module shown in FIG. 13 except the following point:

The spiral wound membrane module shown in FIG. 17 is not provided with the air diffuser 102, the pipe 35 and the valve 30g dissimilarly to the spiral wound membrane module shown in FIG. 13, but an ultrasonic oscillator 103 is provided on the outer periphery of a tubular case 11 of a pressure vessel 10.

In filtration, valves 30a and 30e of pipes 25 and 28 are opened and valves 30b, 30c, 30d and 30f of pipes 26, 27, 27a and 29 are closed.

Raw water 7 taken from a raw water tank 500 is pressurized by a pressure pump 101, and thereafter fed into the pressure vessel 10 from a raw water inlet 13 through the pipe 25. In the spiral wound membrane module, the fed raw water 7 is introduced into a first liquid chamber 18 of the pressure vessel 10 from the raw water inlet 13, and further fed into a spiral wound membrane element 1 from a firs end thereof.

The ultrasonic oscillator 103 provided on the tubular case 11 of the pressure vessel 10 supplies ultrasonic vibration to the raw water 7 stored in the pressure vessel 10 and the spiral wound membrane element 1 through the pressure vessel 10.

As shown in FIG. 17, the raw water 7 fed to the spiral wound membrane element 1 from a first end surface thereof linearly flows toward a second end surface in a direction (axial direction) parallel to a water collection pipe 5 along a raw water spacer 6. In the process of the flow of the raw water 7 along the raw water spacer 6, the raw water 7 is partially permeated through separation membranes 2 due to the pressure difference between the raw waterside and a permeate side. This permeate 8 flows into the water collection pipe 5 along a permeate spacer 3, and is discharged from an end of the water collection pipe 5. The remaining raw water 7a not permeated through the separation membranes 2 is discharged from the second end surface of the spiral wound membrane element 1.

The permeate 8 discharged from the end of the water collection pipe 5 is taken out from the pressure vessel 10 from a permeate outlet 14 through the pipe 28, as shown in FIG. 17. On the other hand, the raw water 7a discharged from the second end surface of the spiral wound membrane element 1 is guided into a second liquid chamber 19. In this case, the valve 30c of the pipe 27 connected to a raw water outlet 15 and the valve 30d of the pipe 27a are closed, and hence permeation through the separation membranes 2 is prompted in the spiral wound membrane element 1 for performing dead end filtration.

The ultrasonic oscillator 103 supplies ultrasonic vibration to the raw water 7 stored in the spiral wound membrane module, thereby dispersing contaminants contained in the raw water 7. Thus, the contaminants contained in the raw water 7 can be inhibited from adhering to the inner part of the spiral wound membrane module, particularly to the membrane surface of the spiral wound membrane element 1. Further, the spiral wound membrane element 1 is also supplied with ultrasonic vibration, whereby contaminants adhering to the membrane surface of the spiral wound membrane element 1 can be separated. Thus, stable running can be performed continuously over a long period.

After filtration is performed for a constant time, back wash reverse filtration is performed with wash water from the permeate side. The wash water is prepared from the permeate 8, for example. In washing, the ultrasonic oscillator 103 is stopped for performing back wash reverse filtration and flushing with the raw water by a method similar to the washing method for a spiral wound membrane element and a spiral wound membrane module shown in FIG. 15. Also in this case, flushing with raw water is performed before, after or in parallel with back wash reverse filtration as described above.

Thus, contaminants adhering to the membrane surface of the spiral wound membrane element 1, the raw water spacer 6 etc., particularly to the separation membranes 2 can be readily and reliably discharged along the axial direction, for suppressing increase of resistance of the separation membranes 2. Therefore, a stable permeate flow rate can be regularly maintained.

In filtration, the valve 30d of the pipe 27a may be opened for partially taking out raw water from the raw water outlet 15. In this case, the raw water 7a discharged from the second end surface of the spiral wound membrane element 1 is guided into the second liquid chamber 19 and thereafter taken out from the raw water outlet 15 through the pipe 27a, to be returned to the raw water tank 500. Alternatively, the taken out raw water 7a may be totally discharged from the system.

Thus, retention of any liquid can be suppressed in the clearance between the outer peripheral surface of the spiral wound membrane element 1 and the inner peripheral surface of the pressure vessel 10 by performing filtration in the spiral wound membrane module while taking out the partial raw water 7a from the raw water outlet 15. Further, an axial flow of the raw water is formed from the first end toward the second end in the spiral wound membrane element 1, whereby partial contaminants can be discharged from the pressure vessel 10 along with the raw water 7a while inhibiting contaminants contained in the raw water 7 from sedimentation.

While the ultrasonic oscillator 103 is provided on the outer periphery of the tubular case 11 of the pressure vessel 10 in the above description, the ultrasonic oscillator 103 may alternatively be provided on an end plate 12a or 12b of the pressure vessel 10. Also in this case, ultrasonic vibration can be supplied to the raw water 7 and the spiral wound membrane element 1 through the pressure vessel 10. Further alternatively, ultrasonic vibration may be directly supplied to the raw water 7 or the spiral wound membrane element 1.

While the spiral wound membrane module has the pressure vessel 10 charged with the single spiral wound membrane element 1 in the above description, the method of running a spiral wound membrane element and a spiral wound membrane module shown in FIG. 17 is also applicable to a spiral wound membrane module formed by charging a pressure vessel with a plurality of spiral wound membrane elements, as described below.

FIG. 18 is a schematic sectional view showing a further exemplary method of running a spiral wound membrane element and a spiral wound membrane module according to the present invention.

The spiral wound membrane module shown in FIG. 18 is similar in structure to the spiral wound membrane module shown in FIG. 16 except the following point:

The spiral wound membrane module shown in FIG. 18 is not provided with the air diffuser 102, the pipe 65 and the valve 65j dissimilarly to the spiral wound membrane module shown in FIG. 16 but an ultrasonic oscillator 103 is provided on the outer periphery of a tubular case 111 of a pressure vessel 100. As described above, the ultrasonic vibrator 103 may alternatively be provided on an end plate 120a or 120b of the pressure vessel 100. Further alternatively, ultrasonic vibration may be directly supplied to raw water 7 or spiral wound membrane elements 1 without through the pressure vessel 100.

In filtration of the spiral wound membrane module, valves 60a, 60e and 60f of pipes 55, 58a and 58b are opened and valves 60b, 60d, 60g, 60h and 60c of pipes 56, 57a, 59a, 59b and 57 are closed.

The raw water 7 taken from a raw water tank 500 is pressurized by a pressure pump 101, and thereafter fed into the pressure vessel 100 from a raw water inlet 130 through the pipe 55. In the spiral wound membrane module, the raw water 7 fed from the raw water inlet 130 is introduced into the endmost spiral wound membrane element 1 closer to the end plate 120a from a first end surface thereof.

The ultrasonic oscillator 103 supplies ultrasonic vibration to the raw water 7 stored in the pressure vessel 100 and the spiral wound membrane elements 1 through the pressure vessel 100.

In each spiral wound membrane element 1, partial raw water is permeated through separation membranes 2 to flow into a water collection pipe 5 and is discharged from an end of the water collection pipe 5 as permeate 8, as shown in FIG. 6. The remaining raw water 7a not permeated through the separation membranes 2 is discharged from the second end surface. The discharged raw water 7a is introduced into the subsequent spiral wound membrane element 1 from a first end surface thereof, and separated into permeate 8 and raw water 7a similarly to the above. Thus, membrane separation is performed in each of the plurality of serially connected spiral wound membrane elements 1. In this case, the valves 60c and 60d of the pipes 57 and 57a are closed, and hence permeation through the separation membranes 2 is prompted in each spiral wound membrane element 1 for performing dead end filtration in the spiral wound membrane module, similarly to the case shown in FIG. 17.

The ultrasonic oscillator 103 supplies ultrasonic vibration to the raw water 7 stored in the spiral wound membrane module, thereby dispersing contaminants contained in the raw water 7. Thus, the contaminants contained in the raw water 7 can be inhibited from adhering to the inner part of the spiral wound membrane module, particularly to the membrane surfaces of the spiral wound membrane elements 1. Further, the spiral wound membrane elements 1 are also supplied with ultrasonic vibration, whereby contaminants adhering to the membrane surfaces of the spiral wound membrane elements 1 can be separated. Thus, stable running can be performed continuously over a long period.

Further, the spiral wound membrane module charged with the plurality of spiral wound membrane elements 1 has a large treatment capacity, so that permeate 52 can be efficiently obtained.

After performing filtration for a constant time, back wash reverse filtration with wash water is performed from the permeate side. The wash water is prepared from the permeate 8, for example. In this case, the ultrasonic oscillator 103 is stopped for performing back wash reverse filtration and flushing with raw water by a method similar to the washing method for a spiral wound membrane element and a spiral wound membrane module shown in FIG. 17.

Thus, contaminants adhering to the membrane surfaces of the spiral wound membrane elements 1, the raw water spacers 6 etc., particularly to the separation membranes 2 can be readily and reliably discharged along the axial direction, for suppressing increase of resistance of the separation membranes 2. Therefore, a stable permeate flow rate can be regularly maintained.

In filtration running, the valve 60d of the pipe 57a may be opened for taking out partial raw water from the raw water outlet 131, as shown in FIG. 16. In this case, the partial raw water is taken out from the raw water outlet 131 through the pipe 57a, and returned to the raw water tank 500. Alternatively, the taken out raw water may be totally discharged from the system.

Thus, retention of any liquid can be suppressed in the clearances between the outer peripheral surfaces of the spiral wound membrane elements 1 and the inner peripheral surface of the pressure vessel 100 by performing filtration in the spiral wound membrane module while taking out the partial raw water from the raw water outlet 131. Further, axial flows of raw water from the first ends toward the second ends are formed in the spiral wound membrane elements 1, whereby partial contaminants can be discharged from the pressure vessel 100 along with the raw water while suppressing contaminants contained in the raw water from sedimentation.

While ultrasonic vibration is supplied when running the spiral wound membrane element and the spiral wound membrane module in each of the running methods for spiral wound membrane elements and spiral wound membrane elements shown in FIGS. 17 and 18, ultrasonic vibration may alternatively be supplied in an operation other than running.

For example, ultrasonic vibration may be supplied in back wash reverse filtration. Alternatively, ultrasonic vibration may be supplied when running is stopped and the spiral wound membrane module is charged with the raw water 7 or wash water (permeate). Further alternatively, ultrasonic vibration may be supplied when running is stopped and the membrane surfaces are flushed with the raw water 7 or wash water (permeate). An effect similar to the above can be attained also in this case.

In each of the running methods for spiral wound membrane elements and spiral wound membrane elements shown in FIGS. 17 and 18, the partial raw water taken out from the raw water outlet 15 or 131 in running and the raw water employed for flushing in washing may be discharged through the pipe 57.

The aforementioned separation membranes 2 having high back pressure strength can be prevented from breakage also when the spiral wound membrane element 1 shown in FIG. 13, 16, 17 or 18 is subjected to back wash reverse filtration with a back pressure of 0.05 to 0.3 MPa.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of running a spiral wound membrane element, comprising an envelope separation membrane wound on the outer peripheral surface of a perforated hollow pipe and allowing back wash reverse filtration with a back pressure higher than 0.05 MPa and not more than 0.3 MPa, comprising a step of injecting gas of not more than 0.3 MPa from at least one opening end of said perforated hollow pipe as recovery of a filtration velocity, wherein said step of injecting gas includes a step of axially feeding a raw liquid through said spiral wound membrane element in combination with said step of injecting gas as recovery of a filtration velocity, and wherein said step of axially feeding a raw liquid includes a step of returning at least part of said raw liquid axially fed through said spiral wound membrane element to a feeding side of said spiral wound membrane element again.

2. The method of running a spiral wound membrane element according to claim 1, wherein said separation membrane comprises a permeable membrane body bonded to a surface of a porous sheet material in an anchored stare.

3. The method of running a spiral wound membrane element according to claim 1, wherein the step of injecting gas includes a step of introducing a washing liquid from at least one opening end of said perforated hollow pipe and discharging said washing liquid from at least one end of said spiral wound membrane element, thereby performing back wash reverse filtration of said separation membrane with a back pressure higher than 0.05 MPa and not more than 0.3 MPa in combination with said step of injecting gas as recovery of a filtration velocity.

4. A method of running a spiral wound membrane module, comprising a pressure vessel having a raw liquid inlet and one or a plurality of spiral wound membrane elements stored in said pressure vessel with said spiral wound membrane element including a perforated hollow pipe and an envelope separation membrane wound on the outer peripheral surface of said perforated hollow pipe and allowing back wash reverse filtration with a back pressure higher than 0.05 MPa and not more than 0.3 MPa, comprising a step of injecting gas of not more than 0.3 MPa from at least one opening end of said perforated hollow pipe as recovery of a filtration velocity, wherein said step of injecting gas includes a step of introducing a washing liquid from at least one opening end of said perforated hollow pipe and discharging said washing liquid from at least one end of said spiral wound membrane element for taking out said washing liquid from said pressure vessel thereby performing back wash reverse filtration of said separation membrane with a back pressure higher than 0.05 MPa and not more than 0.3 MPa in combination with said step of injecting gas as recovery of a filtration velocity, and wherein said step of introducing a washing liquid includes a step of re-feeding at last part of said washing liquid taken out from said pressure vessel to said raw liquid inlet.

5. The method of running a spiral wound membrane module according to claim 4, wherein said separation membrane comprises a permeable membrane body bonded to a surface of a porous sheet material in an anchored state.

6. The method of running a spiral wound membrane module according to claim 4, wherein said step of injecting gas includes a step of feeding a raw liquid into said spiral wound membrane element from said raw liquid inlet of said pressure vessel and axially feeding said raw liquid through said spiral wound membrane element while taking out said axially fed raw liquid from said pressure vessel in combination with said step of injecting gas as recovery of a filtration velocity.

7. A method of running a spiral wound membrane module, comprising a pressure vessel having a raw liquid inlet and one or a plurality of spiral wound membrane elements stored in said pressure vessel with said spiral wound membrane element including a perforated hollow pipe and an envelope separation membrane wound on the outer peripheral surface of said perforated hollow pipe and allowing back wash reverse filtration with a back pressure higher than 0.05 MPa and not more than 0.3 MPa, comprising a step of injecting gas of not more than 0.3 MPa from at least one opening end of said perforated hollow pipe as recovery of a filtration velocity, wherein said step of injecting gas includes a step of feeding a raw liquid into said spiral wound membrane element from said raw liquid inlet of said pressure vessel and axially feeding said raw liquid through said spiral wound membrane element while taking out said axially fed raw liquid from said pressure vessel in combination with said step of injecting gas as recovery of a filtration velocity, and wherein said step of feeding a raw liquid includes a step of re-feeding at least part of said raw liquid taken out from said pressure vessel to said raw liquid inlet.

8. The method of running a spiral wound membrane module according to claim 7, wherein said step of injecting gas includes a step of introducing a washing liquid from at least one opening end of said perforated hollow pipe and discharging said washing liquid from at least one end of said spiral wound membrane element for taking out said washing liquid from said pressure vessel thereby performing back wash reverse filtration of said separation membrane with a back pressure higher than 0.05 MPa and not more than 0.3 MPa in combination with said step of injecting gas as recovery of a filtration velocity.

9. A method of running a spiral wound membrane element stored in a pressure vessel having a raw liquid inlet for a raw liquid, said element comprising an envelope separation membrane wound on the outer peripheral surface of a perforated hollow pipe and allowing back wash reverse filtration with a back pressure higher than 0.05 MPa and not more than 0.3 MPa, comprising a step of performing an operation of injecting gas of not more than 0.3 MPa from at least one opening end of said perforated hollow pipe as recovery of a filtration velocity, wherein said step of performing an operation includes a step of performing an operation of introducing a washing liquid from at least one opening end of said perforated hollow pipe and discharging said washing liquid from at least one end of said spiral wound membrane element thereby performing back wash reverse filtration of said separation membrane with a back pressure higher than 0.05 MPa and not more than 0.3 MPa in combination with said operation of injecting gas as recovery of a filtration velocity, and wherein said step of performing an operation includes a step of re-feeding at least part of said raw liquid taken out from said pressure vessel to said raw liquid inlet.

10. The method of running a spiral wound membrane element according to claim 9, wherein said step of performing an operation includes a step of performing an operation of axially feeding said raw liquid through said spiral wound membrane element in combination with said operation of injecting gas as recovery of a filtration velocity.

11. The method of running a spiral wound membrane element according to claim 9, wherein said separation membrane is formed by bonding a permeable membrane body to a surface of a porous sheet material, and said permeable membrane body is bonded to said surface of said porous sheet material in an anchored state.

12. A treatment system comprising:

a spiral wound membrane module comprising a pressure vessel having a raw liquid inlet and one or a plurality of spiral wound membrane elements stored in said pressure vessel, each spiral wound membrane element including a perforated hollow pipe and an envelope separation membrane wound on the outer peripheral surface of said perforated hollow pipe and said envelope separation membrane having back pressure strength allowing back wash reverse filtration with a back pressure higher than 0.05 MPa and not more than 0.3 MPa;

a first raw liquid feeding system for feeding a raw liquid into said spiral wound membrane element through said raw liquid inlet of said pressure vessel;

a permeated liquid takeout system for taking out a permeated liquid from at least one opening end of said perforated hollow pipe;

a gas injection system for injecting gas of not more than 0.3 MPa into said spiral wound membrane element from at least one opening end of said perforated hollow pipe;

a washing liquid introduction system for introducing a washing liquid from at least one opening end of said perforated hollow pipe; and a re-feeding system for re-feeding at least part of said raw liquid taken out from said pressure vessel to said raw liquid inlet.

13. A treatment system comprising:

a spiral wound membrane module comprising a pressure vessel having a raw liquid inlet and one or a plurality of spiral wound membrane elements stored in said pressure vessel, each spiral wound membrane element including a perforated hollow pipe and an envelope separation membrane wound on the outer peripheral surface of said perforated hollow pipe and said envelope separation membrane having back pressure strength allowing back wash reverse filtration with a back pressure higher than 0.05 MPa and not more than 0.3 MPa;

a first raw liquid feeding system for feeding a raw liquid into said spiral wound membrane element through said raw liquid inlet of said pressure vessel;

a permeated liquid takeout system for taking out a permeated liquid from at least one opening end of said perforated hollow pipe;

a gas injection system for injecting gas of not more than 0.3 MPa into said spiral wound membrane element from at least one opening end of said perforated hollow pipe;

a second raw liquid feeding system for feeding a raw liquid into said spiral wound membrane element through said raw liquid inlet of said pressure vessel for axially feeding said raw liquid through said spiral wound membrane element and taking out said axially fed raw liquid from said pressure vessel; and a re-feeding system for re-feeding at least part of said raw liquid taken out from said pressure vessel to said raw liquid inlet.

* * * * *